US012794366B2

(12) United States Patent
Park et al.

(10) Patent No.: US 12,794,366 B2
(45) Date of Patent: Nov. 10, 2026

(54) DC-DC CONVERTER AND OPERATING METHOD OF DC-DC CONVERTER

(71) Applicant: Samsung Electronics Co., Ltd., Suwon-si (KR)

(72) Inventors: Hyungju Park, Suwon-si (KR); Minwoo Kim, Suwon-si (KR); Minyong Jung, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 389 days.

(21) Appl. No.: 18/540,325

(22) Filed: Dec. 14, 2023

(65) Prior Publication Data

US 2024/0380323 A1 Nov. 14, 2024

(30) Foreign Application Priority Data

May 11, 2023 (KR) ........................ 10-2023-0060954
Aug. 2, 2023 (KR) ........................ 10-2023-0101059

(51) Int. Cl.
*H02M 3/158* (2006.01)

(52) U.S. Cl.
CPC .................................. *H02M 3/158* (2013.01)

(58) Field of Classification Search
CPC .................................................... H02M 3/158
See application file for complete search history.

(56) References Cited

U.S. PATENT DOCUMENTS 7,116,085 B2 * 10/2006 Ikezawa .................. H02M 1/15 323/259
7,256,570 B2 * 8/2007 Zhou ..................... H02M 3/156 323/224
7,378,823 B2 * 5/2008 Yamanaka ............ H02M 3/156 323/267
7,432,689 B2 10/2008 Miller et al.
7,679,133 B2 3/2010 Son et al.
7,944,191 B2 5/2011 Xu
8,179,113 B2 * 5/2012 Singnurkar ......... H02M 3/1582 323/283
8,269,472 B2 9/2012 Lin
8,553,466 B2 10/2013 Han et al.
8,559,235 B2 10/2013 Yoon et al.
8,654,587 B2 2/2014 Yoon et al.
9,035,638 B2 5/2015 Singnurkar
9,525,350 B2 12/2016 Hari et al.
9,893,623 B2 2/2018 Tanabe
10,516,336 B2 12/2019 Fishelov et al.
2005/0093526 A1 * 5/2005 Notman .............. H02M 3/1582 323/282

(Continued)

*Primary Examiner* — Rafael O De Leon Domenech
(74) *Attorney, Agent, or Firm* — HARNESS, DICKEY & PIERCE, P.L.C.

(57) ABSTRACT

Disclosed is a DC-DC converter which includes a voltage converter configured to receive an input voltage through an input node, to convert the input voltage into an output voltage, and to output the output voltage to an output node, and a controller configured to select at least one conversion manner among a plurality of conversion manners based on a first ratio of a charging period of one cycle, to charge internal elements in the at least one conversion manner during the charging period of the one cycle, and to control the voltage converter to discharge the internal elements in the at least one conversion manner during a discharging period of the one cycle.

20 Claims, 25 Drawing Sheets

(56) References Cited

U.S. PATENT DOCUMENTS

| | | | | |
|---|---|---|---|---|
| 2006/0284606 | A1* | 12/2006 | Chen | H02M 1/44<br>323/259 |
| 2007/0085519 | A1* | 4/2007 | Xu | H02M 3/1588<br>323/282 |
| 2011/0233648 | A1 | 9/2011 | Seol et al. | |
| 2013/0328534 | A1 | 12/2013 | Hsieh | |

* cited by examiner

DC-DC CONVERTER AND OPERATING METHOD OF DC-DC CONVERTER

CROSS-REFERENCE TO RELATED APPLICATIONS

This application claims priority under 35 U.S.C. § 119 to Korean Patent Application Nos. 10-2023-0060954 filed on May 11, 2023, and 10-2023-0101059 filed on Aug. 2, 2023, in the Korean Intellectual Property Office, the disclosures of each of which are incorporated by reference herein in their entireties.

BACKGROUND

Various example embodiments described herein relate to an electronic device, and more particularly, relate to a DC-DC converter and/or an operating method of the DC-DC converter.

Electronic devices may operate based on a power, such as DC and/or AC power, provided from the outside. For example, the electronic devices may convert an external power supply voltage from the outside into an internal power supply voltage necessary for or used for internal components and may supply the internal power supply voltage to the internal components. Mobile devices such as a smartphone and/or a smart pad and/or a tablet may further include a battery.

When the external power supply voltage is supplied, the mobile device may convert the external power supply voltage into an internal power supply voltage may operate based on the internal power supply voltage. Alternatively or additionally, when the external power supply voltage is supplied, the mobile device may charge the battery by using the external power supply voltage. When the external power supply voltage is not supplied, the mobile device may convert a battery power supply voltage into the internal power supply voltage may operate based on the internal power supply voltage.

The battery power supply voltage may vary depending on a charging rate of the battery. For example, as the charging rate of the battery increases, the battery power supply voltage may increase. As the charging rate of the battery decreases, the battery power supply voltage may decrease. Alternatively or additionally, the internal power supply voltage may vary depending on a load. When the load increases, the internal power supply voltage may decrease to be lower than a target voltage level (e.g., at least transiently). When the internal power supply voltage is lower than the target voltage level, the mobile device may be powered off.

SUMMARY

Accordingly, a device that converts the battery power supply voltage into the internal power supply voltage can be configured to convert a varying input voltage (e.g., the battery power supply voltage) into a fixed voltage (e.g., the target voltage level of the internal power supply voltage).

Various example embodiments may provide a DC-DC converter which intuitionally determines operation modes and conversion manners based on one cycle and may have an improved and/or reduced complexity. Alternatively or additionally, various example embodiments may provide an operating method of the DC-DC converter.

According to various example embodiments, a DC-DC converter includes a voltage converter configured to receive an input voltage through an input node, to convert the input voltage into an output voltage, and to output the output voltage to an output node, and a controller configured to select at least one conversion manner among a plurality of conversion manners based on a first ratio of a charging period of one cycle, to charge internal elements in the at least one conversion manner during the charging period of the one cycle, and to control the voltage converter to discharge the internal elements in the at least one conversion manner during a discharging period of the one cycle.

Alternatively or additionally according to various example embodiments, a DC-DC converter includes a voltage converter configured to receive an input voltage through an input node, converts the input voltage into an output voltage, and to output the output voltage to an output node, and a controller configured to charge internal elements during a charging period of one cycle and to control the voltage converter to discharge the internal elements during a discharging period of the one cycle. The controller is configured to adjust a timing to reset the one cycle based on the input voltage and the output voltage.

Alternatively or additionally according to various example embodiments, an operating method of a DC-DC converter which converts an input voltage into an output voltage includes performing charging of internal elements while changing a voltage conversion manner over time, the performing charging of internal elements being in a charging period of one cycle, performing discharging of the internal elements based on a last voltage conversion manner of the charging period, the performing discharging of the internal elements in a discharging period of the one cycle, and resetting the one cycle based on the input voltage and the output voltage.

BRIEF DESCRIPTION OF THE FIGURES

The above and other objects and/or features will become apparent by describing in detail various example embodiments thereof with reference to the accompanying drawings.

DETAILED DESCRIPTION

Below, embodiments will be described in detail and clearly to such an extent that an ordinary one in the art easily carries out and practices various example embodiments.

Figure 1:
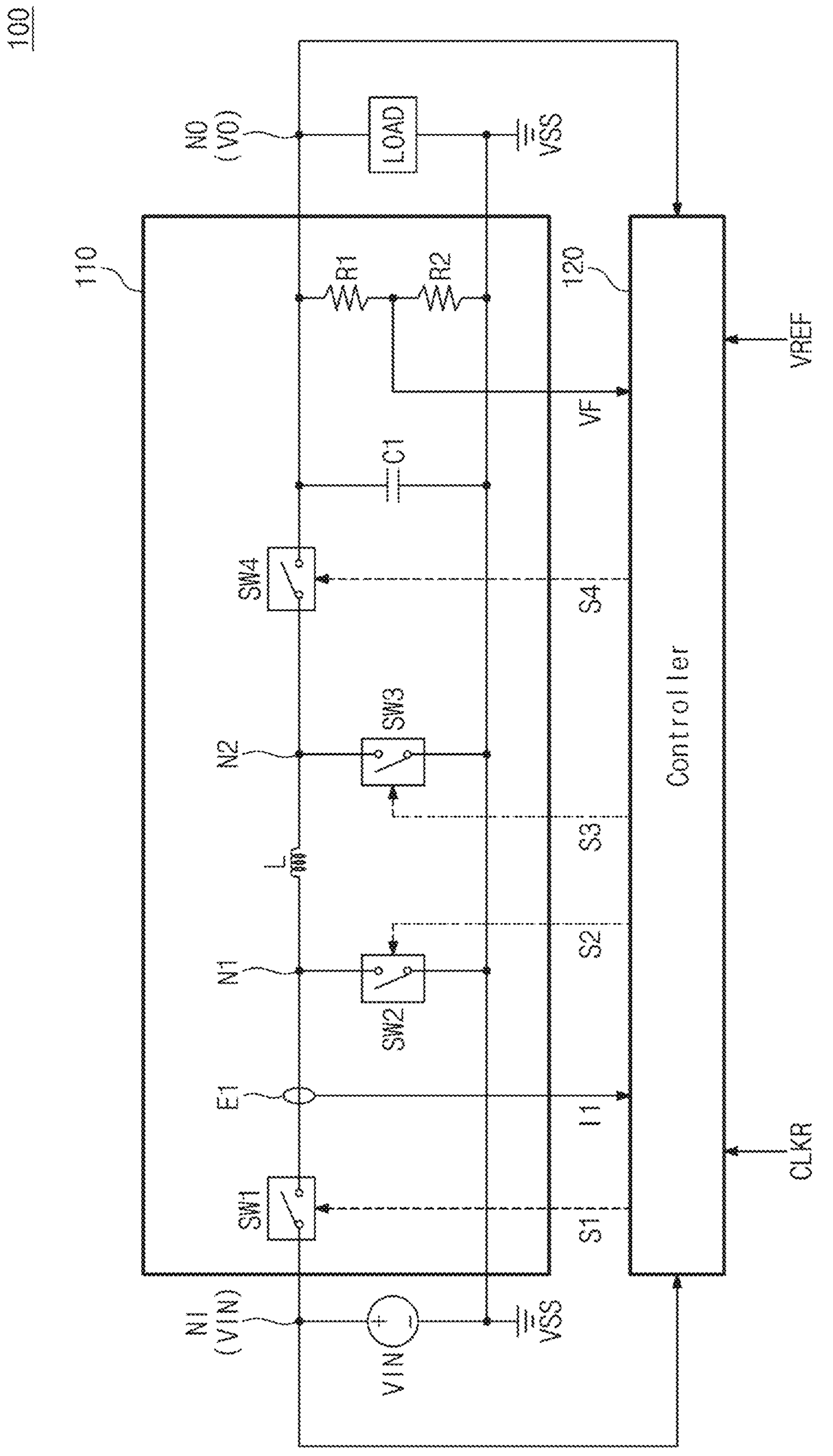
FIG. 1 illustrates a DC-DC converter according to various example embodiments of the present disclosure.

FIG. 1 illustrates a DC-DC converter 100 according to various example embodiments. Referring to FIG. 1, the DC-DC converter 100 may include a voltage converter 110 and a controller 120. The voltage converter 110 may include a first switch SW1, a second switch SW2, a third switch SW3, a fourth switch SW4, an inductor L, a first capacitor C1, a first resistor R1, and a second resistor R2.

The first switch SW1 may be connected between (or directly connected between) an input node NI, to which an input voltage VIN is input, and a first node N1. The first switch SW1 may be controlled by a first signal S1 transferred from the controller 120. The second switch SW2 may be connected between (or directly connected between) the first node N1 and a ground node to which a ground voltage VSS is input. The second switch SW2 may be controlled by a second signal S2 transferred from the controller 120.

The third switch SW3 may be connected between (or directly connected between) a second node N2 and the ground node to which the ground voltage VSS is input. The third switch SW3 may be controlled by a third signal S3 transferred from the controller 120. The fourth switch SW4 may be connected between (or directly connected between) the second node N2 and an output node NO from which an output voltage VO is output. The fourth switch SW4 may be controlled by a fourth signal S4 transferred from the controller 120. In some example embodiments, each of the switches SW1 to SW4 may be transistors, such as but not limited to n-channel field effect transistors; however, example embodiments are not limited thereto.

The first capacitor C1 may be connected between (or directly connected between) the output node NO and the ground node. The first resistor R1 and the second resistor R2 may be connected in series between the output node NO and the ground node. The first resistor R1 and the second resistor R2 may constitute or correspond to a voltage divider that divides the output voltage VO to generate a feedback voltage VF. The feedback voltage VF may be transferred to the controller 120.

The voltage converter 110 may further include a first current extractor E1. The first current extractor E1 may extract a current flowing to the first node N1 through the first switch SW1, for example, first current information I1. The first current information I1 may be transferred to the controller 120. The first current information I1 may correspond to a current and/or to a voltage whose level indicates a current amount.

The input node NI may be connected to an external power source providing the input voltage VIN, for example, a battery. The output node NO may be connected to a load. For example, the load may include an integrated circuit and/or an OLED panel to which the DC-DC converter 100 supplies the output voltage VO.

The controller 120 may receive the first current information I1, the input voltage VIN, the output voltage VO, and the feedback voltage VF from the voltage converter 110. The controller 120 may receive a reference clock signal CLKR and a reference voltage VREF from the external device. The reference voltage VREF may correspond to the target voltage level of the output voltage VO. For example, the level of the reference voltage VREF may be determined such that the level of the output voltage VO is adjusted to the target voltage level. The controller 120 may control the first signal S1, the second signal S2, the third signal S3, and the fourth signal S4 based on the first current information I1, the input voltage VIN, the output voltage VO, the feedback voltage VF, the reference clock signal CLKR, and the reference voltage VREF.

For example, the controller 120 may perform one or more of a buck conversion, buck-boost conversion, or boost conversion to convert the input voltage VIN into the output voltage VO.

Figure 2:
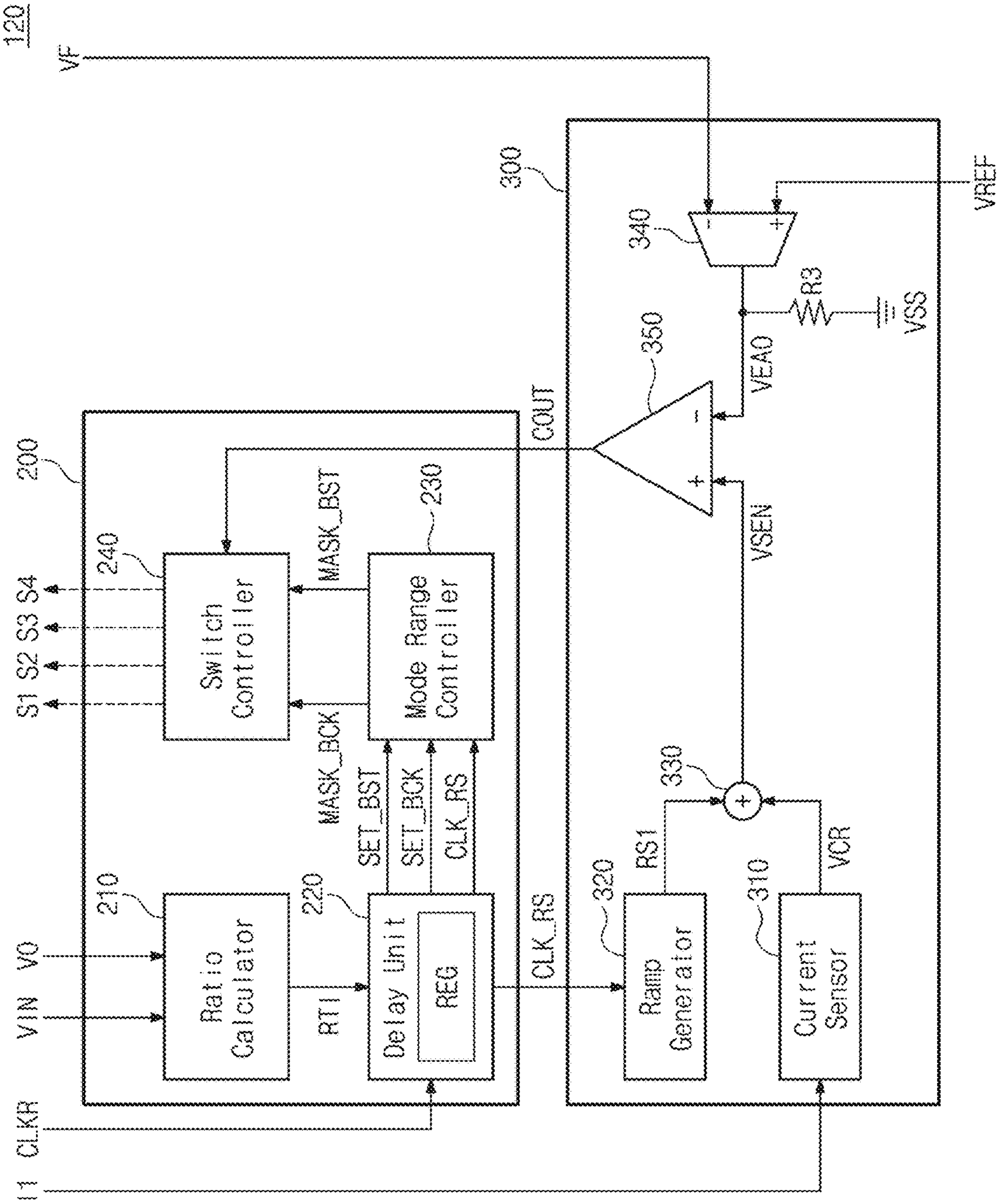
FIG. 2 illustrates a controller according to various example embodiments.

FIG. 2 illustrates the controller 120 according to various example embodiments. Referring to FIGS. 1 and 2, the controller 120 may include a control circuit 200 and a comparison circuit 300. The control circuit 200 may receive the input voltage VIN and the output voltage VO from the voltage converter 110. The control circuit 200 may receive the reference clock signal CLKR from the external device. The control circuit 200 may receive a comparison signal COUT from the comparison circuit 300. The controller 120 may control the first signal S1, the second signal S2, the third signal S3, and the fourth signal S4, each based on one or more of the input voltage VIN, the output voltage VO, the reference clock signal CLKR, and the comparison signal COUT.

The control circuit 200 may include a ratio calculator 210, a delay unit 220, a mode range controller 230, and a switch controller 240. The ratio calculator 210 may receive the input voltage VIN and the output voltage VO. The ratio calculator 210 may calculate a value corresponding to a ratio of the output voltage VO to the input voltage VIN. For example, the ratio calculator 210 may output ratio information RTI, which may be a result obtained by multiplying the ratio of the output voltage VO to the input voltage VIN and a time length of one cycle together.

For example, one cycle may correspond to one period in which the voltage converter 110 converts the input voltage VIN into the output voltage VO by performing charging and discharging with respect to internal elements (e.g., the inductor L and the first capacitor C1). The controller 120 may allow the voltage converter 110 to repeatedly execute a plurality of cycles such that the input voltage VIN is converted into the output voltage VO.

The delay unit 220 may receive the reference clock signal CLKR from the external device. The delay unit 220 may delay the reference clock signal CLKR based on information stored in a register REG included in the delay unit 220. The delay unit 220 may generate a boost clock signal SET_BST and a buck clock signal SET_BCK by delaying the reference clock signal CLKR based on the information stored in the register REG. The boost clock signal SET_BST may be used with regard to a boost conversion manner (and/or or a buck-boost conversion manner) among conversion manners including a buck conversion manner, a buck-boost conversion manner, and a boost conversion manner. The buck clock signal SET_BCK may be used with regard to the buck conversion manner (and/or the buck-boost conversion manner) among the conversion manners including the buck conversion manner, the buck-boost conversion manner, and the boost conversion manner.

The delay unit 220 may receive the ratio information RTI from the ratio calculator 210. The delay unit 220 may delay the reference clock signal CLKR based on the information stored in the register REG and the ratio information RTI. The delay unit 220 may generate a ramp clock signal CLK_RS by delaying the reference clock signal CLKR based on the information stored in the register REG and the ratio information RTI. The ramp clock signal CLK_RS may be used with regard to a ramp signal of a ramp generator 320 of the comparison circuit 300. In some example embodiments, the ramp clock signal CLK_RS may be used to determine the length of the one cycle.

The mode range controller 230 may receive the boost clock signal SET_BST, the buck clock signal SET_BCK, and the ramp clock signal CLK_RS from the delay unit 220. The mode range controller 230 may independently activate and/or deactivate a buck mask signal MASK_BCK and/or a boost mask signal MASK_BST based on the boost clock signal SET_BST, the buck clock signal SET_BCK, and the ramp clock signal CLK_RS from the delay unit 220.

For example, when the ramp clock signal CLK_RS toggles, the mode range controller 230 may activate the boost mask signal MASK_BST and may deactivate the buck mask signal MASK_BCK. When the boost clock signal SET_BST toggles, the mode range controller 230 may deactivate the boost mask signal MASK_BST. When the buck clock signal SET_BCK toggles, the mode range controller 230 may activate the buck mask signal MASK_BCK. The mode range controller 230 may provide the buck mask signal MASK_BCK and the boost mask signal MASK_BST to the switch controller 240.

The switch controller 240 may receive the buck mask signal MASK_BCK and the boost mask signal MASK_BST from the mode range controller 230. The switch controller 240 may receive the comparison signal COUT from the comparison circuit 300. The switch controller 240 may control the first signal S1, the second signal S2, the third signal S3, and the fourth signal S4 based on the buck mask signal MASK_BCK, the boost mask signal MASK_BST, and the comparison signal COUT.

For example, the switch controller 240 may operate in a charging period while the comparison signal COUT has the low level in the one cycle. In the charging period, the switch controller 240 may change a voltage conversion manner over time based on the buck mask signal MASK_BCK and the boost mask signal MASK_BST.

For example, when the buck mask signal MASK_BCK is activated, the switch controller 240 may not perform conversion in a buck mode. When the buck mask signal MASK_BCK is deactivated, the switch controller 240 may perform conversion in the buck mode. For example, when the boost mask signal MASK_BST is activated, the switch controller 240 may not perform conversion in a boost mode. When the boost mask signal MASK_BST is deactivated, the switch controller 240 may perform conversion in the boost mode.

For example, the switch controller 240 may sequentially select buck conversion, buck-boost conversion, and boost conversion over time and may control the first signal S1, the second signal S2, the third signal S3, and the fourth signal S4 such that the voltage converter 110 charges the internal elements in the selected voltage conversion manner.

The switch controller 240 may operate in a discharging period while the comparison signal COUT has the high level in the one cycle. In the discharging period, the switch controller 240 may operate in a voltage conversion manner that is the last one used in the charging period. For example, the switch controller 240 may control the first signal S1, the second signal S2, the third signal S3, and the fourth signal S4 such that the voltage converter 110 discharges the internal elements in the voltage conversion manner that is the last one used in the charging period.

The comparison circuit 300 may include a current sensor 310, the ramp generator 320, an adder 330, a transconductor 340, a comparator 350, and a third resistor R3. The current sensor 310 may receive the first current information I1 from the voltage converter 110. The current sensor 310 may output, as a current information voltage VCR, a voltage corresponding to the current amount that the first current information I1 indicates.

The ramp generator 320 may receive the ramp clock signal CLK_RS from the delay unit 220 of the control circuit 200. The ramp generator 320 may output a first ramp signal RS1 that is reset in synchronization with the ramp clock signal CLK_RS. The first ramp signal RS1 may have a level that gradually increases from the level of the ground voltage VSS during a next one cycle after the one cycle is reset. The first ramp signal RS1 may be in the shape of a sawtooth wave; in this case, in each of a plurality of cycles, the first ramp signal RS1 may gradually increase and may then be reset.

The adder 330 may receive the current information voltage VCR from the current sensor 310 and may receive the first ramp signal RS1 from the ramp generator 320. The adder 330 may output a sensing voltage VSEN by adding or based on adding the current information voltage VCR and the first ramp signal RS1. In various example embodiments, the amplitude of the first ramp signal RS1 may be greater than the amplitude of the current information voltage VCR. Accordingly, the sensing voltage VSEN may have a trend line corresponding to the first ramp signal RS1, but the detailed level of the sensing voltage VSEN may be of a waveform that is adjusted by the current information voltage VCR.

The transconductor 340 may receive the feedback voltage VF from the voltage converter 110. The transconductor 340 may receive the reference voltage VREF from the external device. For example, the transconductor 340 may receive the reference voltage VREF as a positive input and may receive the feedback voltage VF as a negative input. The transconductor 340 may amplify a difference between the reference voltage VREF and the feedback voltage VF so as to be output as a current. The third resistor R3 may be connected between an output node of the transconductor 340 and the ground node to which the ground voltage VSS is applied. The third resistor R3 may convert the output current of the transconductor 340 into a voltage, for example, an error voltage VEAO.

The comparator 350 may receive the sensing voltage VSEN and the error voltage VEAO. For example, the comparator 350 may receive the sensing voltage VSEN as a positive input and may receive the error voltage VEAO as a negative input. When the sensing voltage VSEN is less than the error voltage VEAO, the comparator 350 may output the comparison signal COUT of the low level. When the sensing voltage VSEN is greater than or equal to the error voltage VEAO, the comparator 350 may output the comparison signal COUT of the high level.

Figure 3:
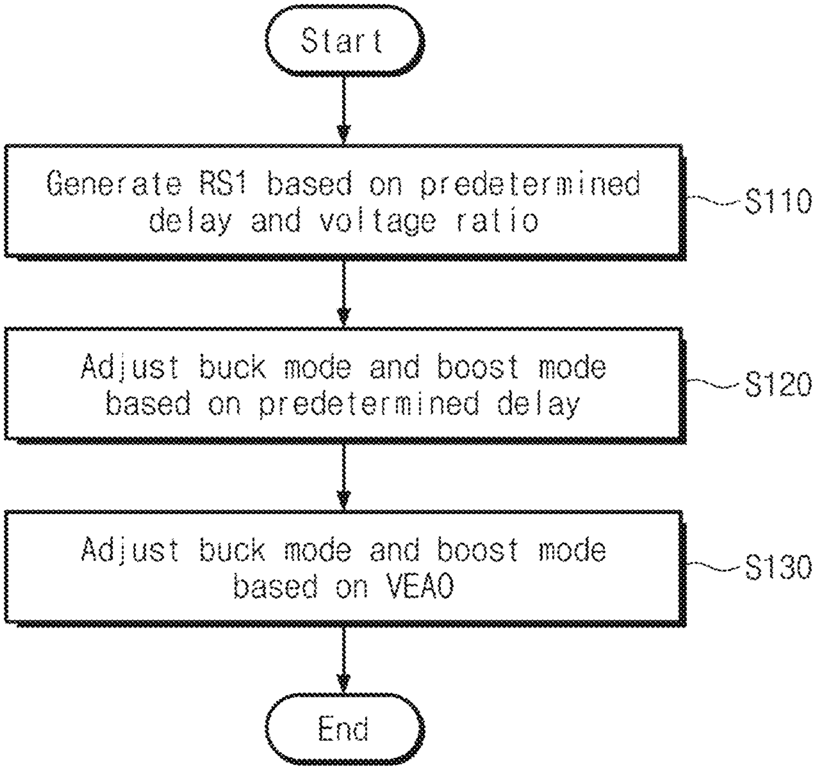
FIG. 3 illustrates an operating method of a controller according to various example embodiments.

FIG. 3 illustrates an operating method of the controller 120 according to various example embodiments. Referring to FIGS. 1, 2, and 3, in operation S110, the controller 120 may generate the first ramp signal RS1 based on a delay (such as a dynamically determined, or, alternatively, predetermined delay) and a voltage ration (such as a dynamically determined, or, alternatively, predetermined voltage ratio). For example, the delay unit 220 may generate the ramp clock signal CLK_RS by delaying the reference clock signal CLKR based on the information stored in the register REG and the ratio information RTI. The ramp generator 320 may generate the first ramp signal RS1 that is reset in response with the ramp clock signal CLK_RS.

In operation S120, the controller 120 may adjust the buck mode and the boost mode based on the delay. For example, the delay unit 220 may generate the boost clock signal SET_BST and the buck clock signal SET_BCK by delaying the reference clock signal CLKR based on the information stored in the register REG. The mode range controller 230 may adjust the buck mode and the boost mode by controlling the buck mask signal MASK_BCK and the boost mask signal MASK_BST based on each of, or at least one of the ramp clock signal CLK_RS, the boost clock signal SET_BST, and the buck clock signal SET_BCK.

For example, when the buck mode is activated (e.g., the buck mask signal MASK_BCK is deactivated) and the boost mode is deactivated (e.g., the boost mask signal MASK_BST is activated), the switch controller 240 may control the first signal S1, the second signal S2, the third signal S3, and the fourth signal S4 based on the buck conversion manner. When the buck mode is activated (e.g., the buck mask signal MASK_BCK is deactivated) and the boost mode is activated (e.g., the boost mask signal MASK_BST is deactivated), the switch controller 240 may control the first signal S1, the second signal S2, the third signal S3, and the fourth signal S4 based on the buck-boost conversion manner.

When the buck mode is deactivated (e.g., the buck mask signal MASK_BCK is activated) and the boost mode is activated (e.g., the boost mask signal MASK_BST is deactivated), the switch controller 240 may control the first signal S1, the second signal S2, the third signal S3, and the fourth signal S4 based on the boost conversion manner. For example, the switch controller 240 may control the first signal S1, the second signal S2, the third signal S3, and the fourth signal S4 such that the voltage converter 110 operates in the charging period of each conversion manner.

In operation S130, the controller 120 may adjust the buck mode and the boost mode based on the error voltage VEAO. When the sensing voltage VSEN is higher than or equal to the error voltage VEAO, the comparison circuit 300 may output the comparison signal COUT of the high level. As the comparison signal COUT transitions to the high level, the switch controller 240 may control the first signal S1, the second signal S2, the third signal S3, and the fourth signal S4 such that the voltage converter 110 operates in the discharging period based on the last conversion manner of the charging period.

Figure 4:
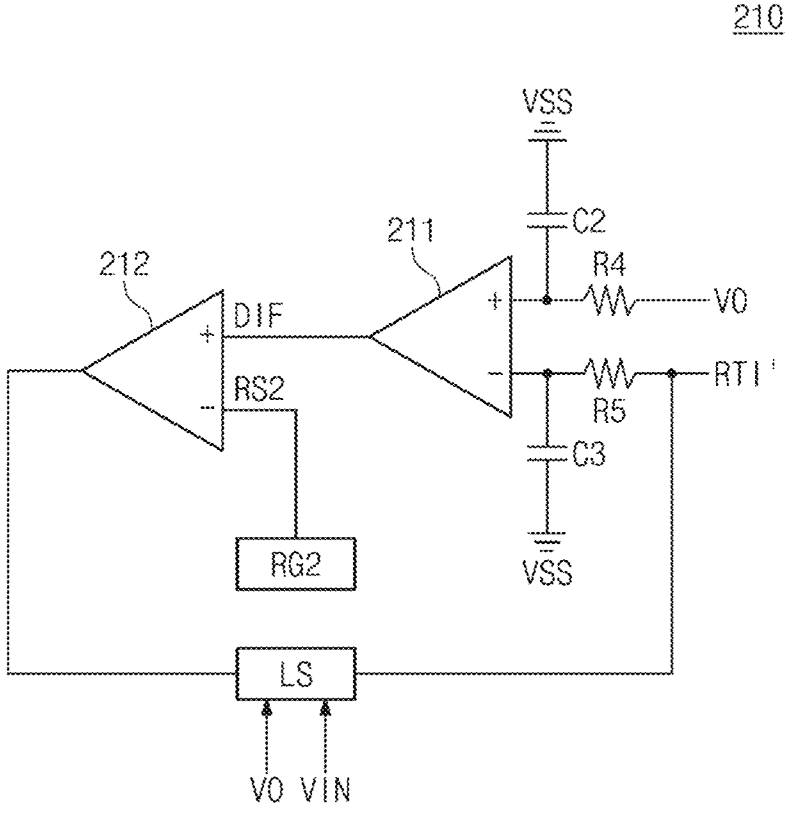
FIG. 4 illustrates a ratio calculator according to various example embodiments.

FIG. 4 illustrates the ratio calculator 210 according to various example embodiments. Referring to FIGS. 1, 2, and 4, the ratio calculator 210 may include an amplifier 211, a second comparator 212, a second ramp generator RG2, a level shifter LS, a fourth resistor R4, a fifth resistor R5, a second capacitor C2, and a third capacitor C3.

A positive input terminal of the amplifier 211 may be connected to the fourth resistor R4 and the second capacitor C2, e.g., to a node common to the fourth resistor R4 and the second capacitor C2. The second capacitor C2 may be connected between the positive input terminal of the amplifier 211 and the ground node to which the ground voltage VSS is applied. The fourth resistor R4 may transfer the output voltage VO to the positive input terminal of the amplifier 211.

A negative input terminal of the amplifier 211 may be connected to the fifth resistor R5 and the third capacitor C3, e.g., to a node common to the fifth resistor R5 and the third capacitor C3. The third capacitor C3 may be connected between the negative input terminal of the amplifier 211 and the ground node to which the ground voltage VSS is applied. The fifth resistor R5 may transfer an output of the level shifter LS to the negative input terminal of the amplifier 211.

The fourth resistor R4 and the second capacitor C2 may operate as a low pass filter. The fifth resistor R5 and the third capacitor C3 may operate as a low pass filter. The amplifier 211 may output a difference signal DIF based on 1) a signal obtained by filtering the output voltage VO through the low pass filter of the fourth resistor R4 and the second capacitor C2 and 2) a signal obtained by filtering the output of the level shifter LS through the low pass filter of the fifth resistor R5 and the third capacitor C3.

The second ramp generator RG2 may generate a second ramp signal RS2. In various example embodiments, the one cycle of the second ramp signal RS2 may be the same as or different from the one cycle of the first ramp signal RS1.

The second comparator 212 may receive the difference signal DIF as a positive input and may receive the second ramp signal RS2 as a negative input. When the difference signal DIF is lower in level (or in absolute level) than the second ramp signal RS2, the second comparator 212 may output the low level. When the level of the difference signal DIF is higher than or equal to the level (or absolute level) of the second ramp signal RS2, the second comparator 212 may output the high level.

The amplifier 211 and the second comparator 212 may operate in a voltage domain of the output voltage VO. The low level of the second comparator 212 may correspond to the ground voltage VSS, and the high level of the second comparator 212 may correspond to the output voltage VO. The level shifter LS may change the voltage domain of the output voltage VO to the voltage domain of the input voltage VIN. When the second comparator 212 outputs the low level of the ground voltage VSS, the level shifter LS may output the low level of the ground voltage VSS. When the second comparator 212 outputs the high level of the output voltage VO, the level shifter LS may output the high level of the input voltage VIN.

The low pass filter of the fifth resistor R5 and the third capacitor C3 may filter (e.g., integrate) the output of the level shifter LS. The filtering result of the low pass filter composed of the fifth resistor R5 and the third capacitor C3 may be output as pre-ratio information RTI'. For example, the ratio information RTI may be expressed by Equation 1 below.

$$RTI = DT \times RTI' = DT \times \frac{VO}{VIN} \quad \text{[Equation 1]}$$

In Equation 1 above, "DT" may be a default time length (e.g., a default period) of the one cycle of the first ramp signal RS1.

Figure 5:
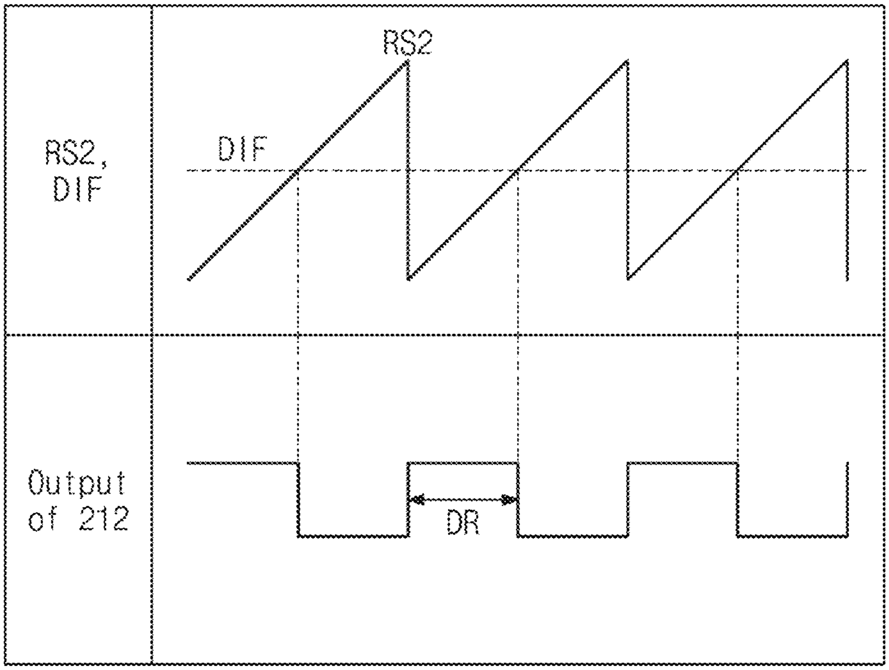
FIG. 5 illustrates an example of a second ramp signal, a difference signal, and an output signal of a second comparator, according to various example embodiments.

FIG. 5 illustrates an example of the second ramp signal RS2, the difference signal DIF, and an output signal of the second comparator 212, according to various example embodiments. In various example embodiments, how the second ramp signal RS2, the difference signal DIF, and the output signal of the second comparator 212 change over time is illustrated in FIG. 5.

For brief description, an example in which the level of the difference signal DIF is fixed is illustrated, but the level of the difference signal DIF may change depending on the change in the level of the output voltage VO or the level of the input voltage VIN.

Referring to FIGS. 4 and 5, during the time period where the level of the difference signal DIF is higher than or equal to the level of the second ramp signal RS2, the output signal of the second comparator 212 may have the high level. During the time period where the level of the difference signal DIF is lower than the level of the second ramp signal RS2, the output signal of the second comparator 212 may have the low level. In some example embodiments, the second ramp signal RS2 may be described as having a sawtooth profile; example embodiments are not limited thereto. In some example embodiments, the output signal of the second comparator 212 may be described as having a square-wave profile; example embodiments are not limited thereto. A duty ratio DR of the output signal of the second comparator 212 may include information corresponding to a ratio of the level of the output voltage VO to the level of the input voltage VIN.

The high level of the output signal of the second comparator 212 may be changed to the input voltage VIN from the output voltage VO through the level shifter LS. The output signal of the level shifter LS may be filtered (e.g., integrated) by the low pass filter composed of the fifth resistor R5 and the third capacitor C3. The level of the filtered signal may include information corresponding to a ratio of the level of the output voltage VO to the level of the input voltage VIN.

Figure 6:
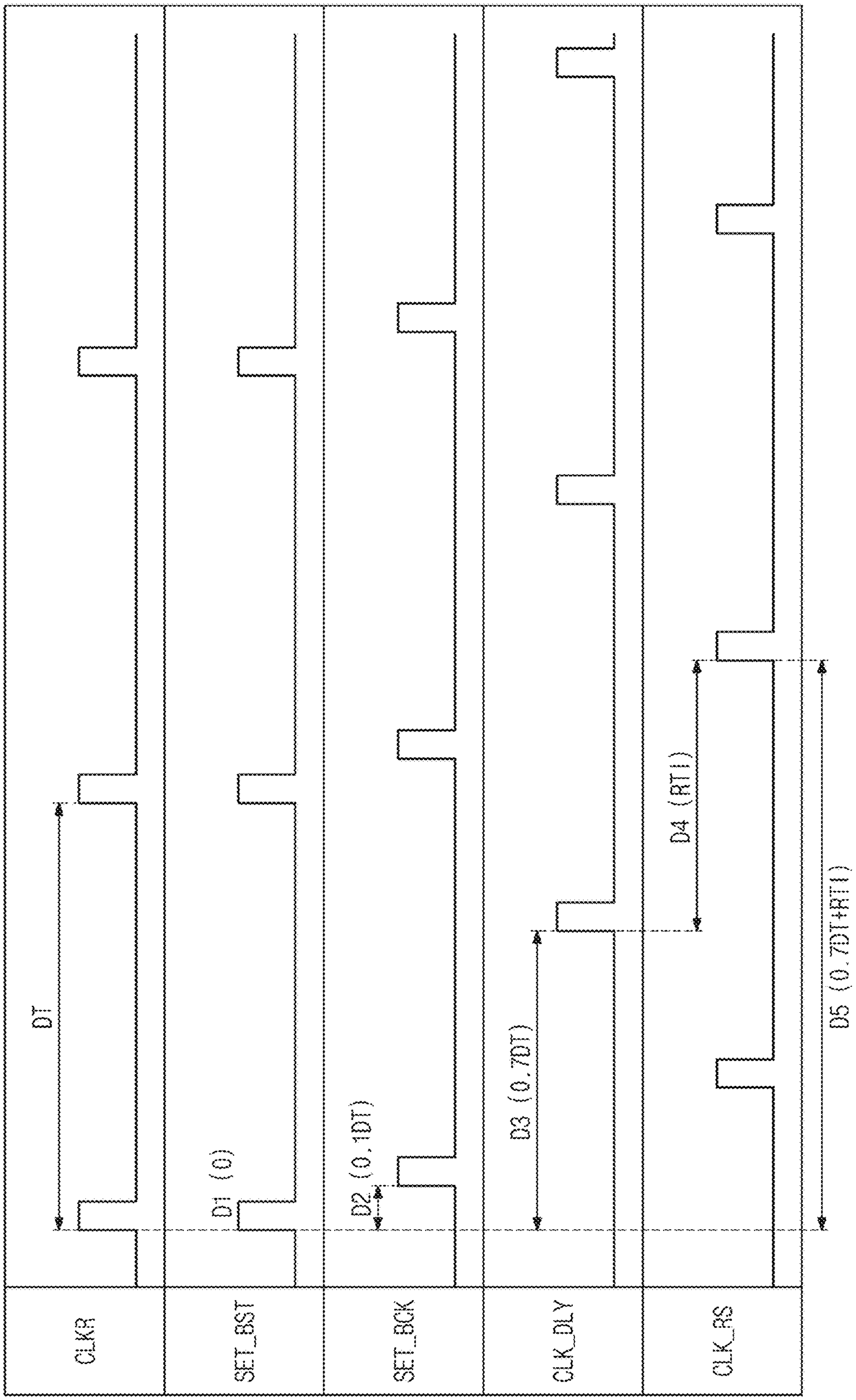
FIG. 6 illustrates an example in which a delay unit generates clock signals from a reference clock signal.

FIG. 6 illustrates an example in which the delay unit 220 generates clock signals from the reference clock signal CLKR. In various example embodiments, how clock signals change over time is illustrated in FIG. 6.

Referring to FIGS. 1, 2, and 6, the reference clock signal CLKR may periodically toggle in a state where the one cycle DT is a period. For example, the toggle may include a first transition from a first level (e.g., a logic low level) to a second level (e.g., a logic high level) and a second transition from the second level to the first level.

The delay unit 220 may generate the boost clock signal SET_BST by delaying the reference clock signal CLKR as much as a first delay value D1 based on the first delay value D1 of the information stored in the register REG. For example, the first delay value D1 may be or may correspond to "0", and the boost clock signal SET_BST may have the same waveform as the reference clock signal CLKR.

The delay unit 220 may generate the buck clock signal SET_BCK by delaying the reference clock signal CLKR as much as a second delay value D2 based on the second delay value D2 of the information stored in the register REG. For example, the second delay value D2 may be or may correspond to "0.1DT", and the buck clock signal SET_BCK may be delayed with respect to the reference clock signal CLKR as much as "0.1DT". The buck clock signal SET_BCK may have the same waveform as, e.g., a shifted waveform as, the reference clock signal CLKR.

The delay unit 220 may generate a delay clock signal CLK_DLY by delaying the reference clock signal CLKR as much as a third delay value D3 based on the third delay value D3 of the information stored in the register REG. For example, the third delay value D3 may be or may correspond to "0.7DT", and the delay clock signal CLK_DLY may be delayed with respect to the reference clock signal CLKR as much as "0.7DT". The delay clock signal CLK_DLY may have the same waveform as, e.g., a shifted waveform as, the reference clock signal CLKR.

The delay unit 220 may generate the ramp clock signal CLK_RS by delaying the delay clock signal CLK_DLY as much as the ratio information RTI based on the ratio information RTI. The ramp clock signal CLK_RS may be delayed with respect to the delay clock signal CLK_DLY as much as the ratio information RTI. The ramp clock signal CLK_RS may have the same waveform as, e.g., a shifted waveform as, the delay clock signal CLK_DLY. Also, the ramp clock signal CLK_RS may be delayed with respect to the reference clock signal CLKR as much as "0.7DT+RTI".

In various example embodiments, detailed numerical values of the first delay value D1, the second delay value D2, and the third delay value D3 are described above. However, the first delay value D1, the second delay value D2, and the third delay value D3 are not limited to the above numerical values. For example, one or more of the first delay value D1, the second delay value D2, and the third delay value D3 may be set by or determined by a manufacturer in the process of manufacturing the DC-DC converter 100. Alternatively or additionally, the DC-DC converter 100 may support a function of updating one or more of the first delay value D1, the second delay value D2, and the third delay value D3 based on information provided from the external device.

Figure 7:
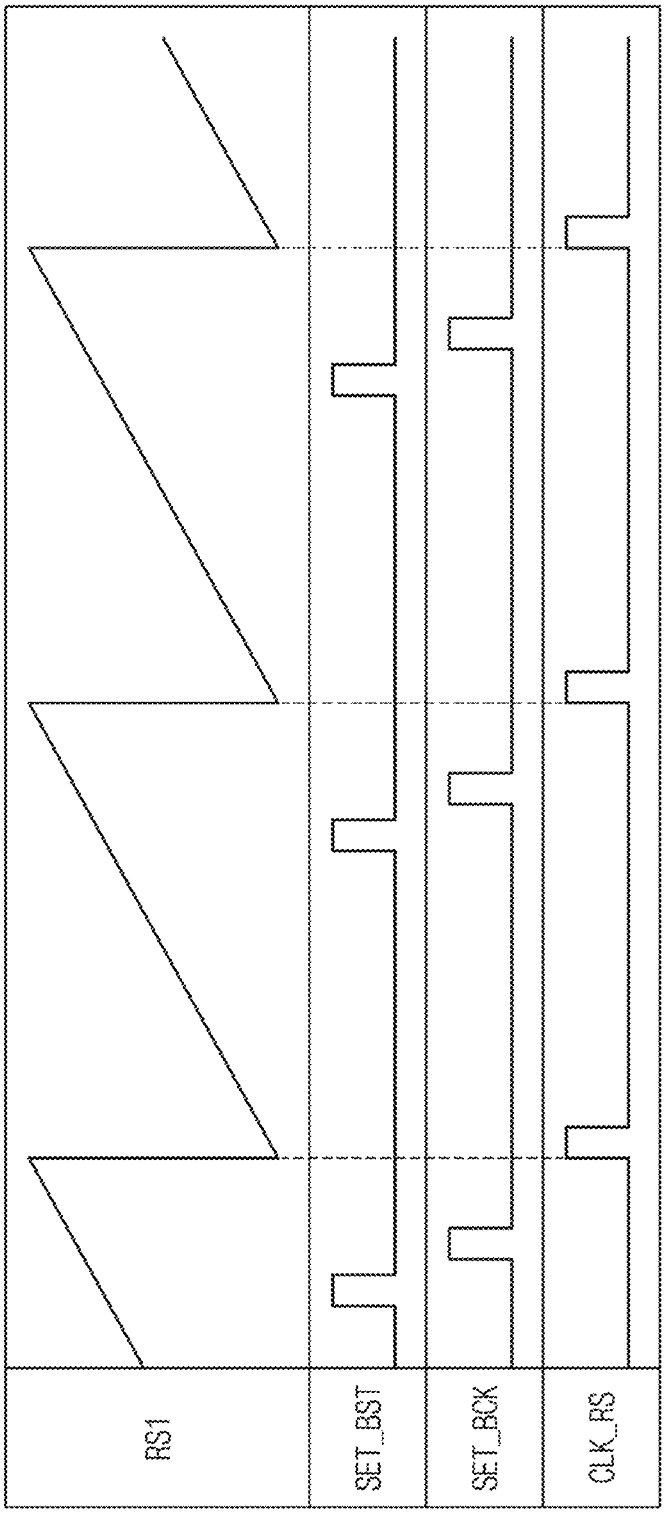
FIG. 7 illustrates an example in which a ramp generator generates a first ramp signal in synchronization with a ramp clock signal.

FIG. 7 illustrates an example in which the ramp generator 320 generates the first ramp signal RS1 in synchronization with the ramp clock signal CLK_RS. In various example embodiments, how the first ramp signal RS1, the boost clock signal SET_BST, the buck clock signal SET_BCK, and the ramp clock signal CLK_RS change over time is illustrated in FIG. 7.

Referring to FIGS. 1, 2, and 7, the ramp generator 320 may reset the first ramp signal RS1 (or the one cycle) in synchronization with the ramp clock signal CLK_RS. The first ramp signal RS1 may be described as having a sawtooth profile; example embodiments are not limited thereto. When the first ramp signal RS1 is reset, the ramp generator 320 may generate the first ramp signal RS1 that gradually increases from the level of the ground voltage to the level of the power supply voltage (e.g., the input voltage VIN, the output voltage VO, or a voltage supplied from the outside) until a next reset point in time.

Because the toggling timing of the ramp clock signal CLK_RS depends on the ratio information RTI, the reset timing of the first ramp signal RS1 may also depend on the ratio information RTI. Because the ratio information RTI indicates the ratio of the output voltage VO to the input voltage VIN, the change in the input voltage VIN or the change in the output voltage VO may cause a change of the reset timing of the first ramp signal RS1.

Figure 8:
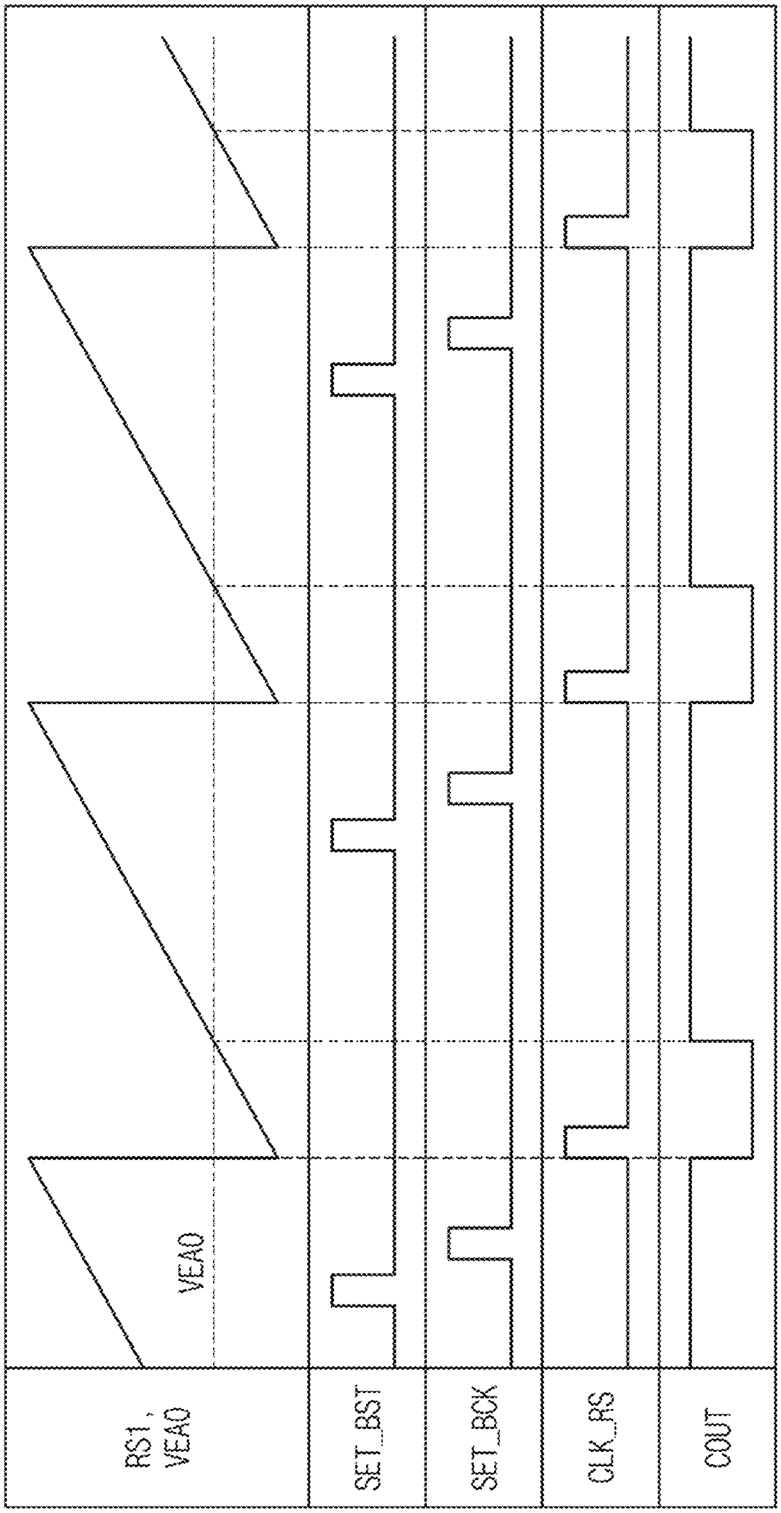
FIG. 8 illustrates an example in which a comparison signal is generated based on a result of comparing a first ramp signal and an error voltage.

FIG. 8 illustrates an example in which the comparison signal COUT is generated based on a result of comparing the first ramp signal RS1 and the error voltage VEAO. In various example embodiments, how the first ramp signal RS1, the error voltage VEAO, the boost clock signal SET_BST, the buck clock signal SET_BCK, the ramp clock signal CLK_RS, and the comparison signal COUT change over time is illustrated in FIG. 8.

For brief description, an example in which the level of the error voltage VEAO is fixed is illustrated, but the level of the error voltage VEAO may change depending on the change in the level of the output voltage VO or the level of the input voltage VIN.

In various example embodiments, the description is given as the sensing voltage VSEN has the trend line corresponding to the first ramp signal RS1 but the detailed level of the sensing voltage VSEN is of a waveform adjusted by the current information voltage VCR. For brief description, the operation of the DC-DC converter 100 will be described by using the first ramp signal RS1 instead of the sensing voltage VSEN.

For example, when the voltage of the first ramp signal RS1 is smaller than the error voltage VEAO, the comparison circuit 300 may output the comparison signal COUT of the low level. When the voltage of the first ramp signal RS1 is greater than or equal to the error voltage VEAO, the comparison circuit 300 may output the comparison signal COUT of the high level.

Figure 9:
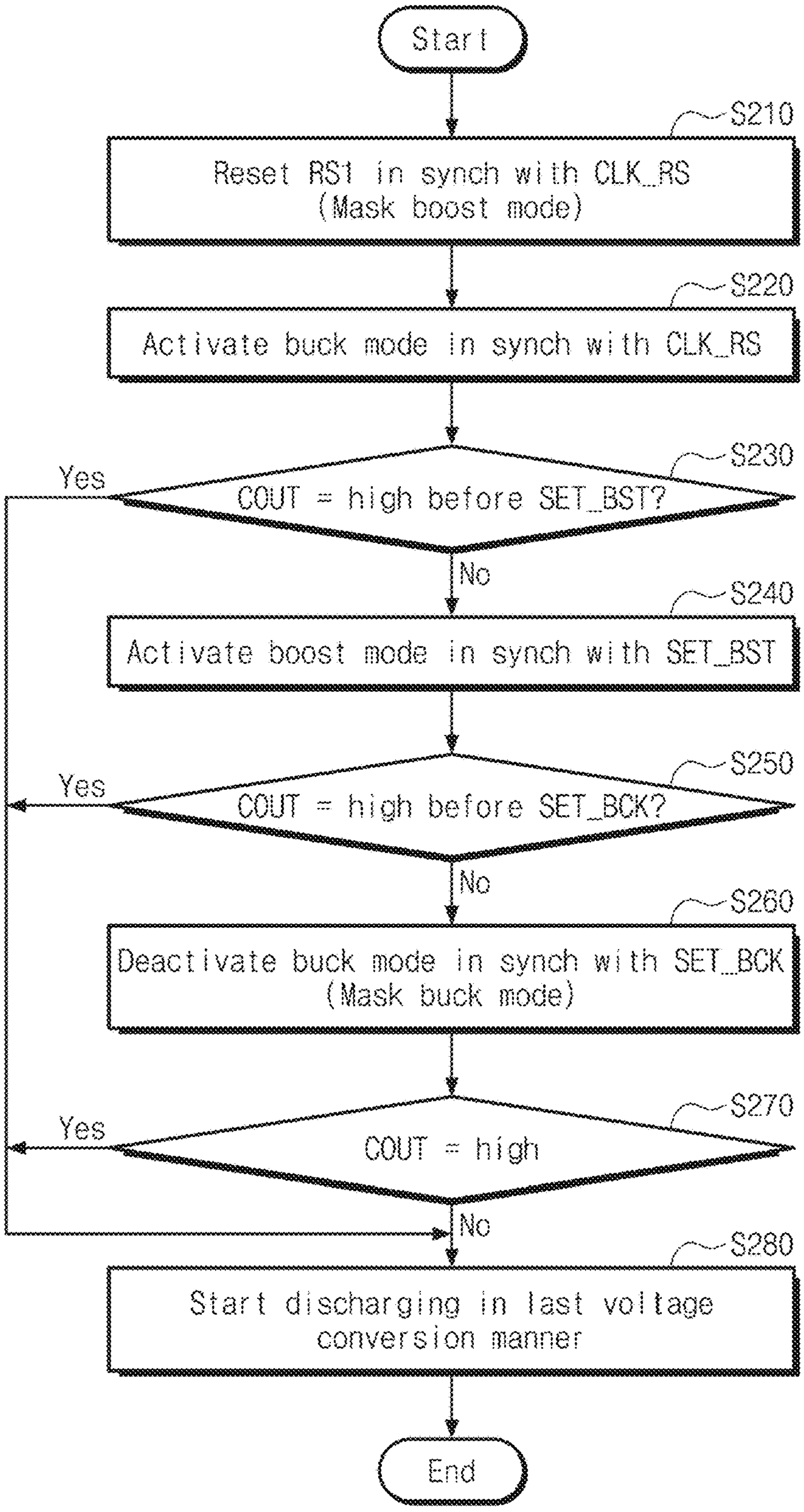
FIG. 9 illustrates an example of an operating method of a switch controller according to various example embodiments.

FIG. 9 illustrates an example of an operating method of the controller 120 according to various example embodiments. Referring to FIGS. 1, 2, and 9, in operation S210, the ramp generator 320 that is included in the comparison circuit 300 of the controller 120 may reset the first ramp signal RS1 in synchronization with the ramp clock signal CLK_RS. The mode range controller 230 may mask the boost mode in synchronization with the ramp clock signal CLK_RS. Until a separate event occurs, the mode range controller 230 may prohibit the boost mode. In various example embodiments, the charging period of the one cycle may start in synchronization with the ramp clock signal CLK_RS.

In operation S220, the mode range controller 230 may activate the buck mode in synchronization with the ramp clock signal CLK_RS. For example, in synchronization with the ramp clock signal CLK_RS, the mode range controller 230 may release the masking (or prohibition) of the buck mode and may activate the buck mode. Because the boost mode is masked, the switch controller 240 may control the first signal S1, the second signal S2, the third signal S3, and the fourth signal S4 such that the internal elements are charged in the buck conversion manner.

In operation S230, the switch controller 240 may determine whether the comparison signal COUT transitions to the high level before the boost clock signal SET_BST toggles. When the switch controller 240 determines that the comparison signal COUT transitions to the high level before the boost clock signal SET_BST toggles, in operation S280, the switch controller 240 may start discharging in the last voltage conversion manner. For example, because the last voltage conversion manner of the charging period is the buck conversion manner, the switch controller 240 may control the first signal S1, the second signal S2, the third signal S3, and the fourth signal S4 such that the internal elements are discharged in the buck conversion manner.

When is the switch controller 240 determines in operation S230 that the comparison signal COUT does not transition to the high level until the boost clock signal SET_BST toggles, in operation S240, the mode range controller 230 may activate the boost mode in synchronization with the boost clock signal SET_BST. For example, in synchronization with the boost clock signal SET_BST, the mode range controller 230 may release the masking of the boost mode and may activate the boost mode. Because the buck mode is activated in operation S220, the mode range controller 230 may activate both the buck mode and the boost mode. In some example embodiments, the switch controller 240 may control the first signal S1, the second signal S2, the third signal S3, and the fourth signal S4 such that the internal elements are charged in the buck-boost conversion manner.

In operation S250, the switch controller 240 may determine whether the comparison signal COUT transitions to the high level before the buck clock signal SET_BCK toggles. When the switch controller 240 determines that the comparison signal COUT transitions to the high level before the buck clock signal SET_BCK toggles, in operation S280, the switch controller 240 may start discharging in the last voltage conversion manner. For example, because the last voltage conversion manner of the charging period is the buck-boost conversion manner, the switch controller 240 may control the first signal S1, the second signal S2, the third signal S3, and the fourth signal S4 such that the internal elements are discharged in the buck-boost conversion manner.

When the switch controller 240 determines in operation S250 that the comparison signal COUT does not transition to the high level until the buck clock signal SET_BCK toggles, in operation S260, the mode range controller 230 may deactivate the buck mode in synchronization with the buck clock signal SET_BCK. For example, in synchronization with the buck clock signal SET_BCK, the mode range controller 230 may mask (or prohibit) the buck mode.

Because the boost mode is activated in operation S240, the mode range controller 230 may use the boost mode. That is, the switch controller 240 may control the first signal S1, the second signal S2, the third signal S3, and the fourth signal S4 such that the internal elements are charged in the boost conversion manner.

In operation S270, the switch controller 240 may determine whether the comparison signal COUT is at the high level. When the switch controller 240 determines that the comparison signal COUT is at the high level, in operation S280, the switch controller 240 may start discharging in the last voltage conversion manner. For example, because the last voltage conversion manner of the charging period is the boost conversion manner, the switch controller 240 may control the first signal S1, the second signal S2, the third signal S3, and the fourth signal S4 such that the internal elements are discharged in boost conversion manner. Until the comparison signal COUT transitions to the high level, the switch controller 240 may continue to perform the charging of the boost conversion manner.

Figure 10:
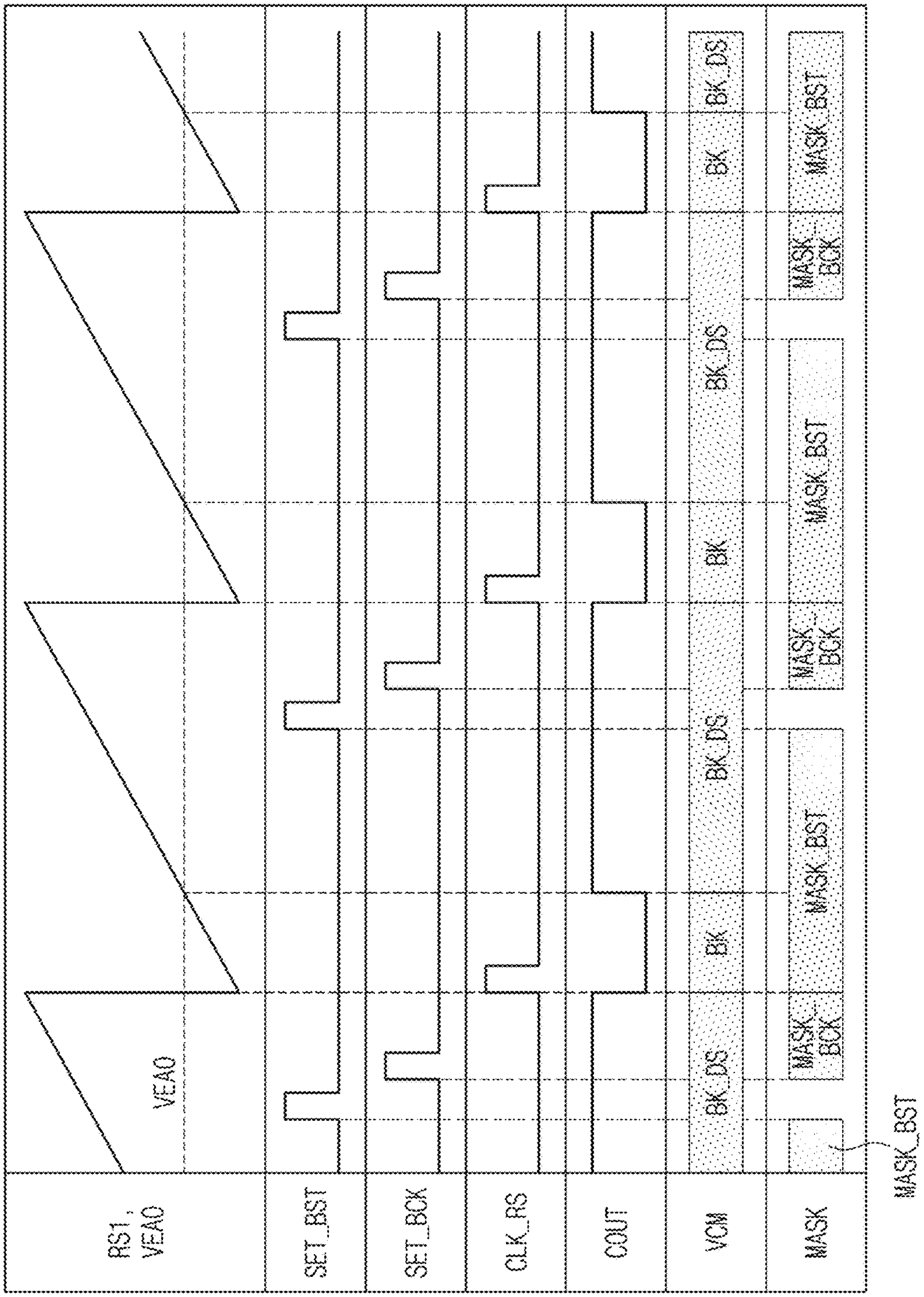
FIG. 10 illustrates an example in which a DC-DC converter performs charging of a buck conversion manner and discharging of a buck conversion manner.

FIG. 10 illustrates an example in which the DC-DC converter 100 performs charging of a buck conversion manner and discharging of a buck conversion manner. In various example embodiments, how the first ramp signal RS1, the error voltage VEAO, the boost clock signal SET_BST, the buck clock signal SET_BCK, the ramp clock signal CLK_RS, the comparison signal COUT, a voltage conversion manner VCM, and mask signals change over time is illustrated in FIG. 10.

Referring to FIGS. 1, 2, and 10, when the ramp clock signal CLK_RS toggles, the first ramp signal RS1 may be reset, and the one cycle may start. Also, when the ramp clock signal CLK_RS toggles, the buck mode may be activated, and the boost mask signal MASK_BST may be activated. The DC-DC converter 100 may perform charging BK to charge the internal elements in the buck conversion manner.

In various example embodiments, before the boost clock signal SET_BST toggles, the comparison signal COUT may transition to the high level. When the comparison signal COUT transitions to the high level, the switch controller 240 may enter the discharging period of the one cycle. Because the last voltage conversion manner of the charging period is the buck conversion manner, the DC-DC converter 100 may perform discharging BK_DS of the buck conversion manner to discharge the internal elements in the buck conversion manner.

After the comparison signal COUT transitions to the high level, the switch controller 240 may ignore the boost clock signal SET_BST and the buck clock signal SET_BCK until the ramp clock signal CLK_RS toggles.

Figure 11:
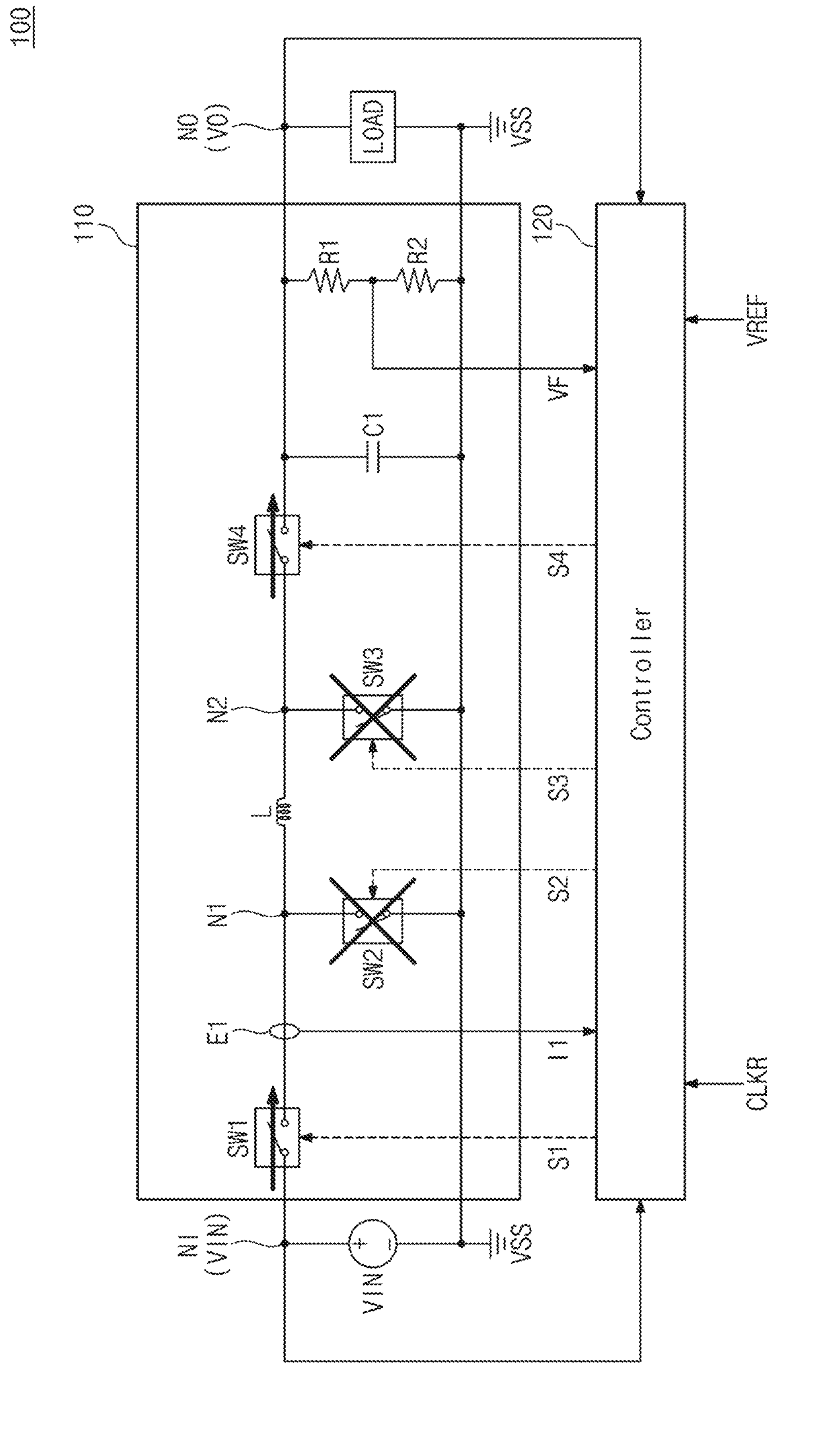
FIG. 11 illustrates an example in which a DC-DC converter controls a first switch, a second switch, a third switch, and a fourth switch while performing charging of a buck conversion manner.

FIG. 11 illustrates an example in which the DC-DC converter 100 controls the first switch SW1, the second switch SW2, the third switch SW3, and the fourth switch SW4 while performing the charging BK of the buck conversion manner.

Referring to FIG. 11, while performing the charging BK of the buck conversion manner, the controller 120 may turn on the first switch SW1, may turn off the second switch SW2, may turn off the third switch SW3, and may turn on the fourth switch SW4.

The input voltage VIN may be connected to an electrical path including the first switch SW1, the inductor L, the fourth switch SW4, the first capacitor C1, and the ground node to which the ground voltage VSS is applied and may charge the inductor L and the first capacitor C1. A voltage that is obtained by dividing the input voltage VIN through the inductor L and the first capacitor C1 may be output as the output voltage VO.

Figure 12:
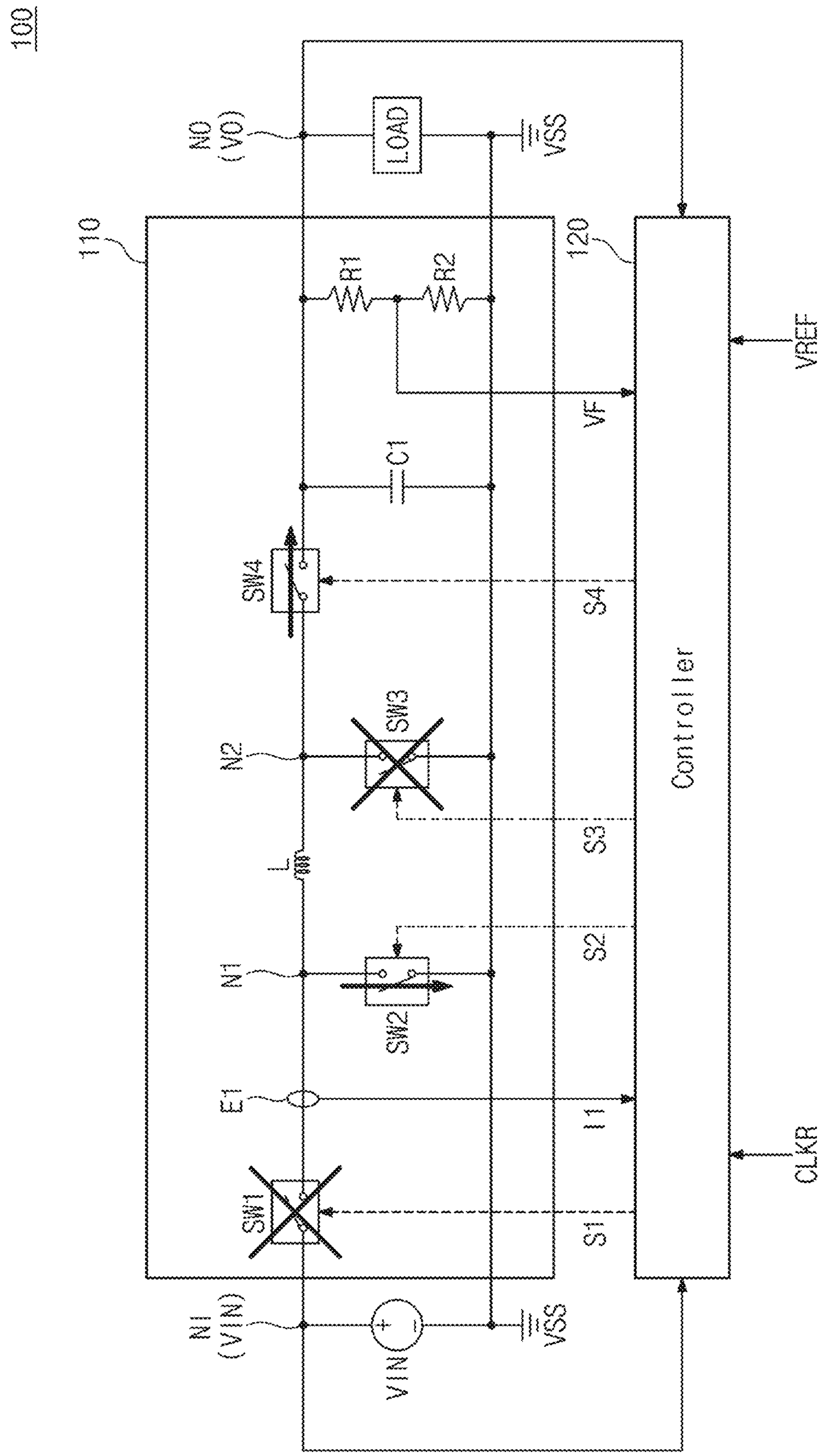
FIG. 12 illustrates an example in which a DC-DC converter controls a first switch, a second switch, a third switch, and a fourth switch while performing discharging of a buck conversion manner.

FIG. 12 illustrates an example in which the DC-DC converter 100 controls the first switch SW1, the second switch SW2, the third switch SW3, and the fourth switch SW4 while performing the discharging BK_DS of the buck conversion manner.

Referring to FIG. 11, while performing the discharging BK_DS of the buck conversion manner, the controller 120 may turn off the first switch SW1, may turn on the second switch SW2, may turn off the third switch SW3, and may turn on the fourth switch SW4.

The inductor L and the first capacitor C1 may be connected in parallel between the output node NO and the ground node. The charges that are stored in the inductor L and the first capacitor C1 may be output as the output voltage VO.

Figure 13:
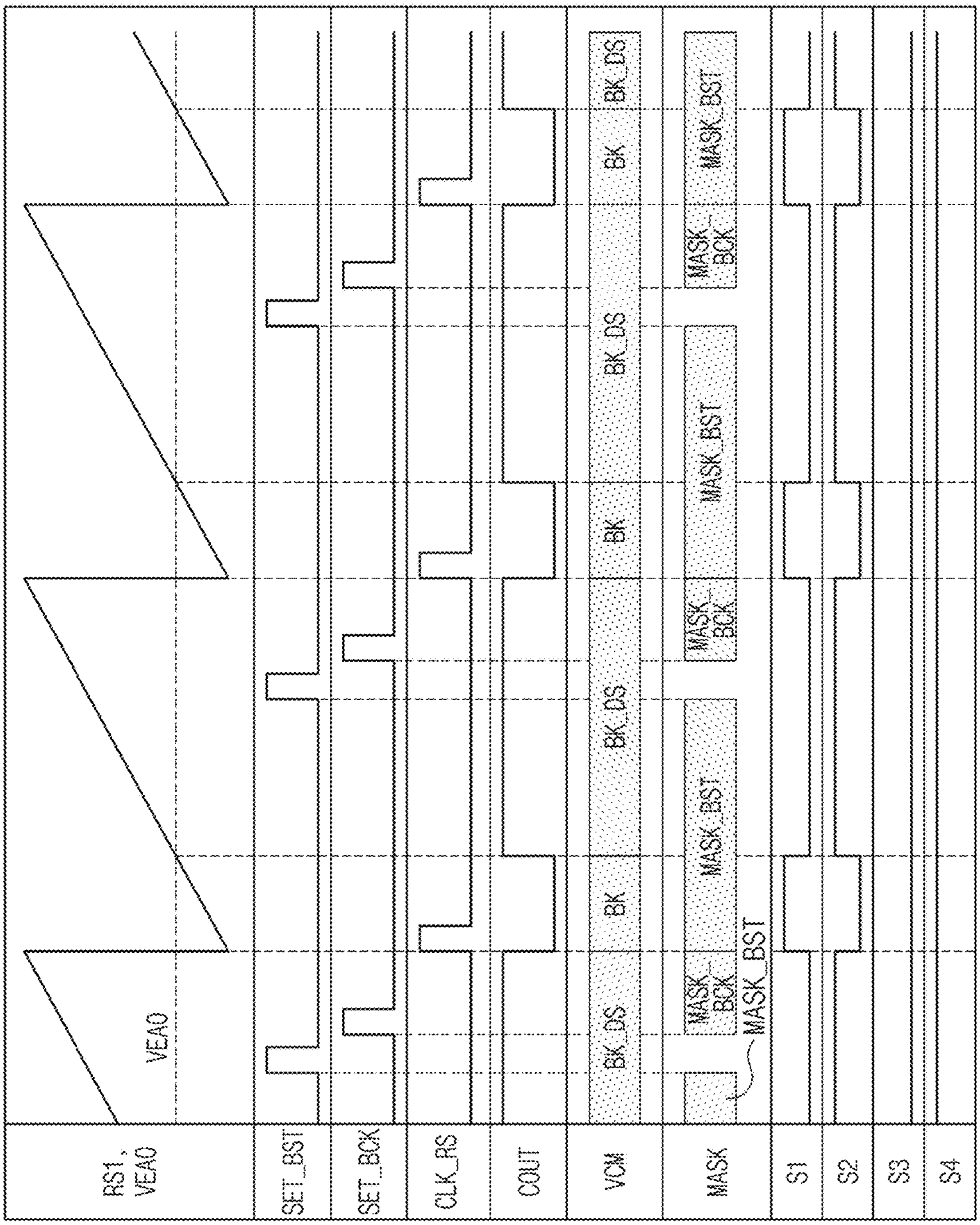
FIG. 13 illustrates an example of signals when a DC-DC converter performs charging of a buck conversion manner and discharging of a buck conversion manner.

FIG. 13 illustrates an example of signals when the DC-DC converter 100 performs charging of a buck conversion manner and discharging of a buck conversion manner. In various example embodiments, how the first ramp signal RS1, the error voltage VEAO, the boost clock signal SET_BST, the buck clock signal SET_BCK, the ramp clock signal CLK_RS, the comparison signal COUT, the voltage conversion manner VCM, mask signals, the first signal S1, the second signal S2, the third signal S3, and the fourth signal S4 change over time is illustrated in FIG. 13.

In the charging BK of the buck conversion manner, the first signal S1 may have the high level such that the first switch SW1 is turned on. In the discharging BK_DS of the buck conversion manner, the first signal S1 may have the low level such that the first switch SW1 is turned off.

In the charging BK of the buck conversion manner, the second signal S2 may have the low level such that the second switch SW2 is turned off. In the discharging BK_DS of the buck conversion manner, the second signal S2 may have the high level such that the second switch SW2 is turned on.

In the charging BK of the buck conversion manner, the third signal S3 may have the low level such that the third switch SW3 is turned off. In the discharging BK_DS of the buck conversion manner, the third signal S3 may have the low level such that the third switch SW3 is turned off. That is, the third signal S3 may maintain the low level during the one cycle.

In the charging BK of the buck conversion manner, the fourth signal S4 may have the high level such that the fourth switch SW4 is turned on. In the discharging BK_DS of the buck conversion manner, the fourth signal S4 may have the high level such that the fourth switch SW4 is turned on. That is, the fourth signal S4 may maintain the high level during the one cycle.

In various example embodiments, in the buck conversion manner, a duty ratio "D" (e.g., a duty ratio of the charging period) may be expressed by Equation 2 below. According to Equation 2 above, even though a configuration and an operation manner of the DC-DC converter 100 according to various example embodiments are different from those of a conventional DC-DC converter, the DC-DC converter 100 may operate in the buck conversion manner by using the same duty ratio "D" as the conventional DC-DC converter.

$$D = \frac{VO}{VIN} \quad \text{[Equation 2]}$$

Figure 14:
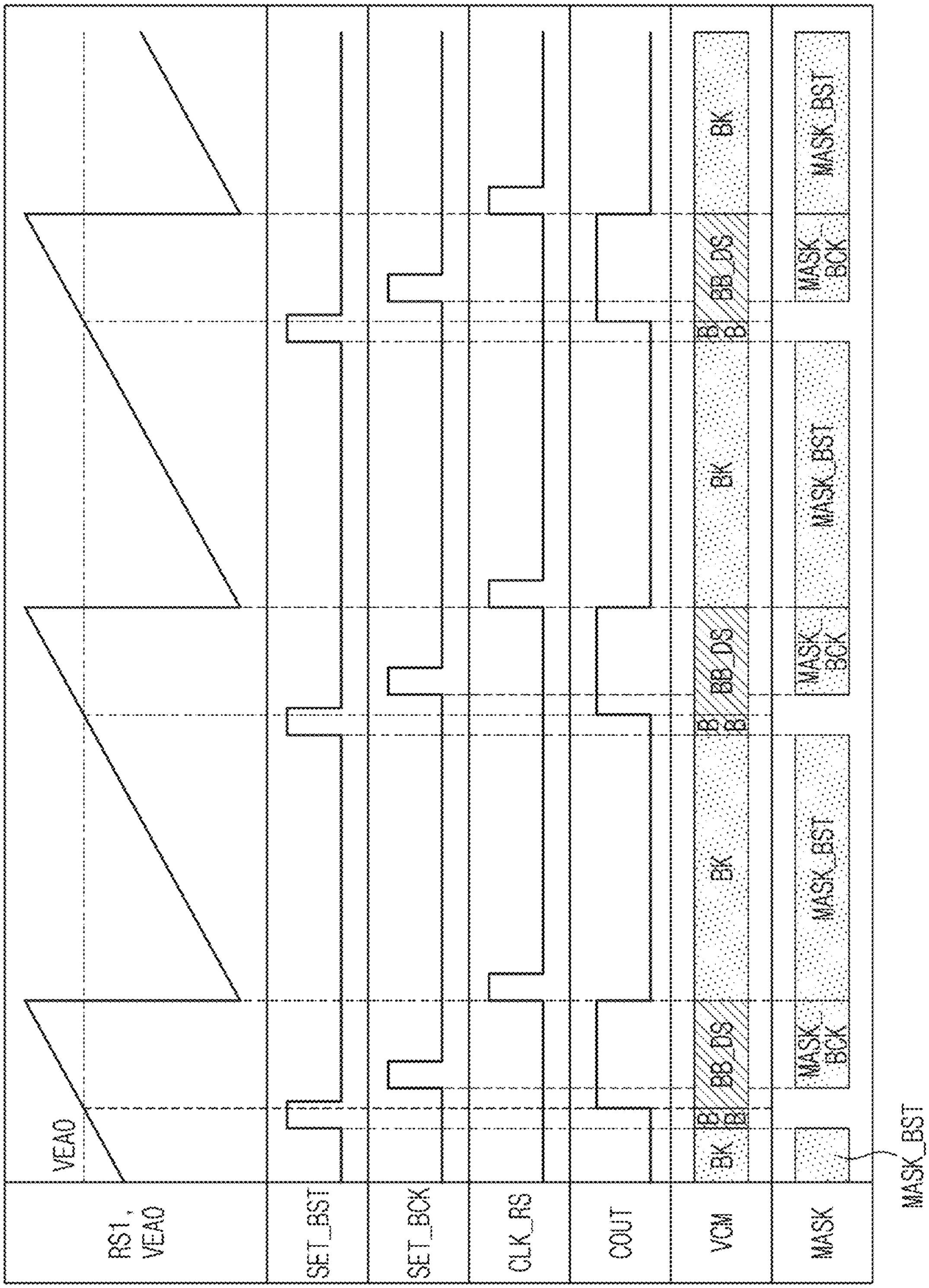
FIG. 14 illustrates an example in which the DC-DC converter performs charging of a buck conversion manner, charging of a buck-boost conversion manner, and discharging of a buck-boost conversion manner.

FIG. 14 illustrates an example in which the DC-DC converter 100 performs charging of a buck conversion manner, charging of a buck-boost conversion manner, and discharging of a buck-boost conversion manner. In various example embodiments, how the first ramp signal RS1, the error voltage VEAO, the boost clock signal SET_BST, the buck clock signal SET_BCK, the ramp clock signal CLK_RS, the comparison signal COUT, the voltage conversion manner VCM, and mask signals change over time is illustrated in FIG. 14.

Referring to FIGS. 1, 2, and 14, when the ramp clock signal CLK_RS toggles, the first ramp signal RS1 may be reset, and the one cycle may start. Also, when the ramp clock signal CLK_RS toggles, the buck mode may be activated, and the boost mask signal MASK_BST may be activated. The DC-DC converter 100 may perform the charging BK of the buck conversion manner to charge the internal elements in the buck conversion manner.

In various example embodiments, before the comparison signal COUT transitions to the high level, the boost clock signal SET_BST may toggle. As the boost clock signal SET_BST toggles, the boost mask signal MASK_BST may be deactivated. The DC-DC converter 100 may perform charging BB of the buck-boost conversion manner to charge the internal elements in the buck-boost conversion manner.

In various example embodiments, before the buck clock signal SET_BCK toggles, the comparison signal COUT may transition to the high level. When the comparison signal COUT transitions to the high level, the switch controller 240 may enter the discharging period of the one cycle. Because the last voltage conversion manner of the charging period is the buck-boost conversion manner, the DC-DC converter 100 may perform discharging BB_DS of the buck-boost conversion manner to discharge the internal elements in the buck-boost conversion manner.

After the comparison signal COUT transitions to the high level, the switch controller 240 may ignore the buck clock signal SET_BCK until the ramp clock signal CLK_RS toggles.

Figure 15:
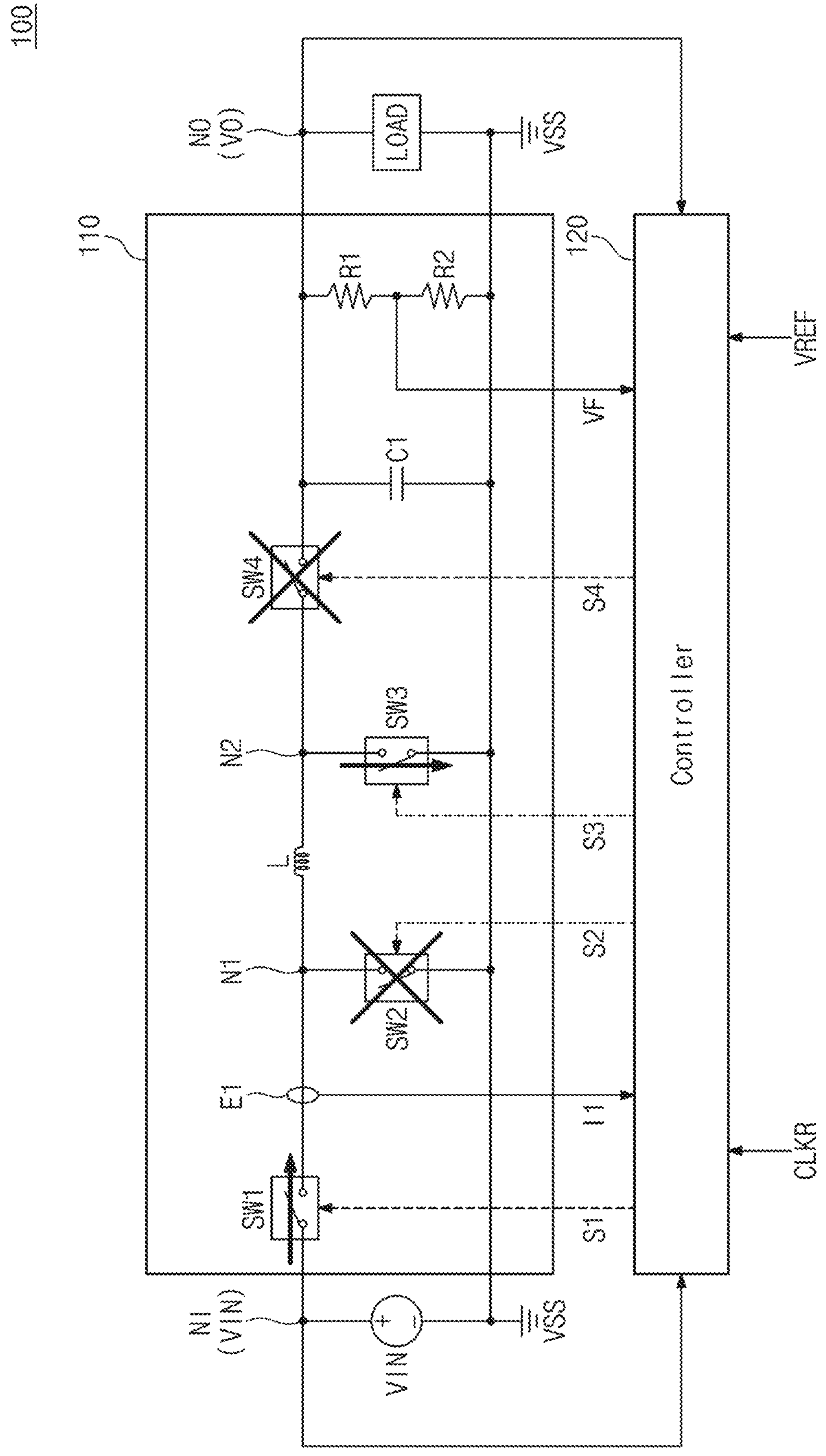
FIG. 15 illustrates an example in which a DC-DC converter controls a first switch, a second switch, a third switch, and a fourth switch while performing charging of a buck-boost conversion manner.

FIG. 15 illustrates an example in which the DC-DC converter 100 controls the first switch SW1, the second switch SW2, the third switch SW3, and the fourth switch SW4 while performing the charging BB of the buck-boost conversion manner.

Referring to FIG. 15, while performing the charging BB of the buck-boost conversion manner, the controller 120 may turn on the first switch SW1, may turn off the second switch SW2, may turn on the third switch SW3, and may turn off the fourth switch SW4.

The input voltage VIN may be connected to an electrical path including the first switch SW1, the inductor L, the third switch SW3, and the ground node to which the ground voltage VSS is applied and may charge the inductor L.

Figure 16:
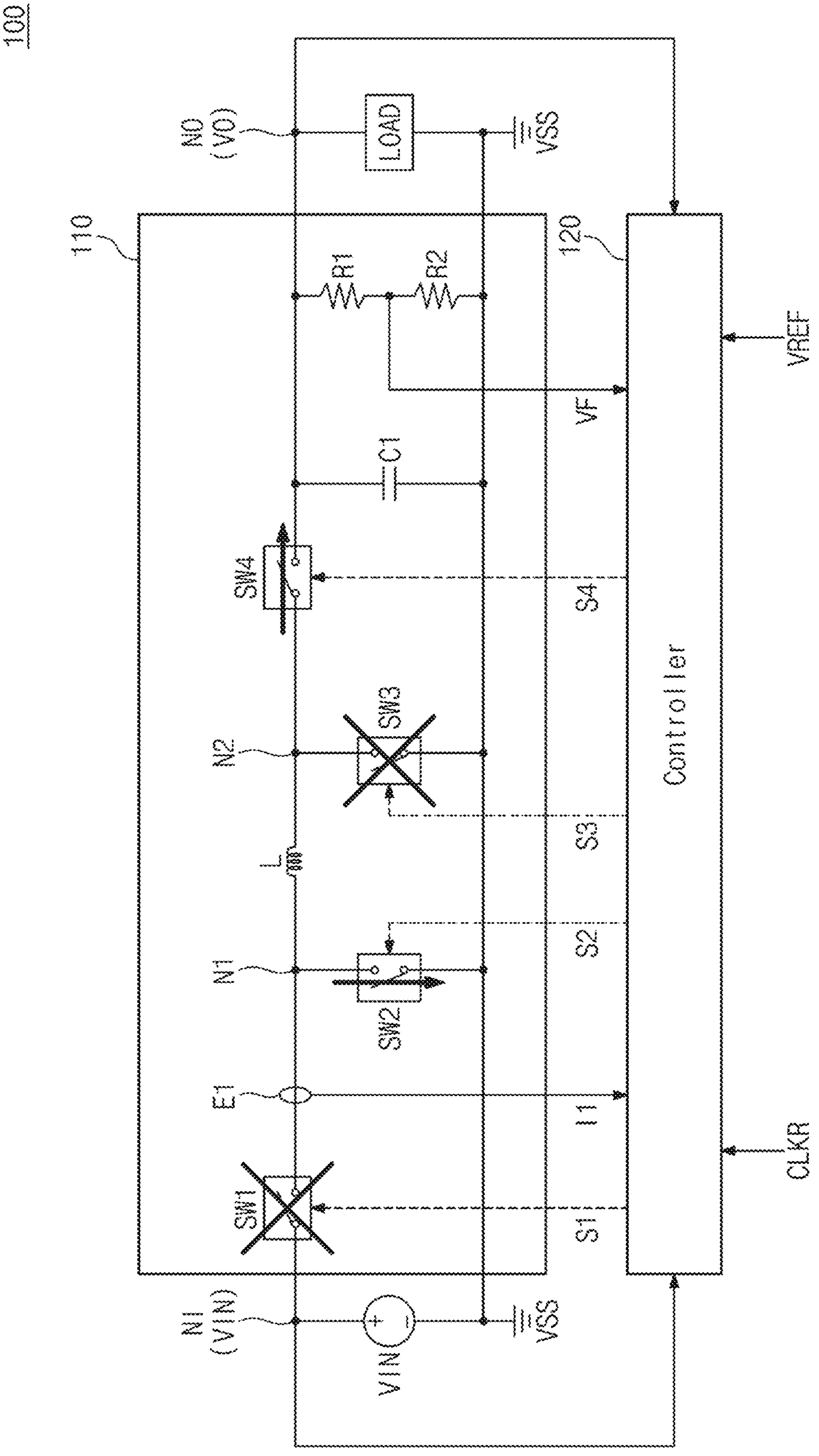
FIG. 16 illustrates an example in which a DC-DC converter controls a first switch, a second switch, a third switch, and a fourth switch while performing discharging of a buck-boost conversion manner.

FIG. 16 illustrates an example in which the DC-DC converter 100 controls the first switch SW1, the second switch SW2, the third switch SW3, and the fourth switch SW4 while performing the discharging BB_DS of the buck-boost conversion manner.

Referring to FIG. 16, while performing the discharging BB_DS of the buck-boost conversion manner, the controller 120 may turn off the first switch SW1, may turn on the second switch SW2, may turn off the third switch SW3, and may turn on the fourth switch SW4.

The inductor L and the first capacitor C1 may be connected in parallel between the output node NO and the ground node. The charges that are stored in the inductor L may charge the first capacitor C1 may be output as the output voltage VO.

Figure 17:
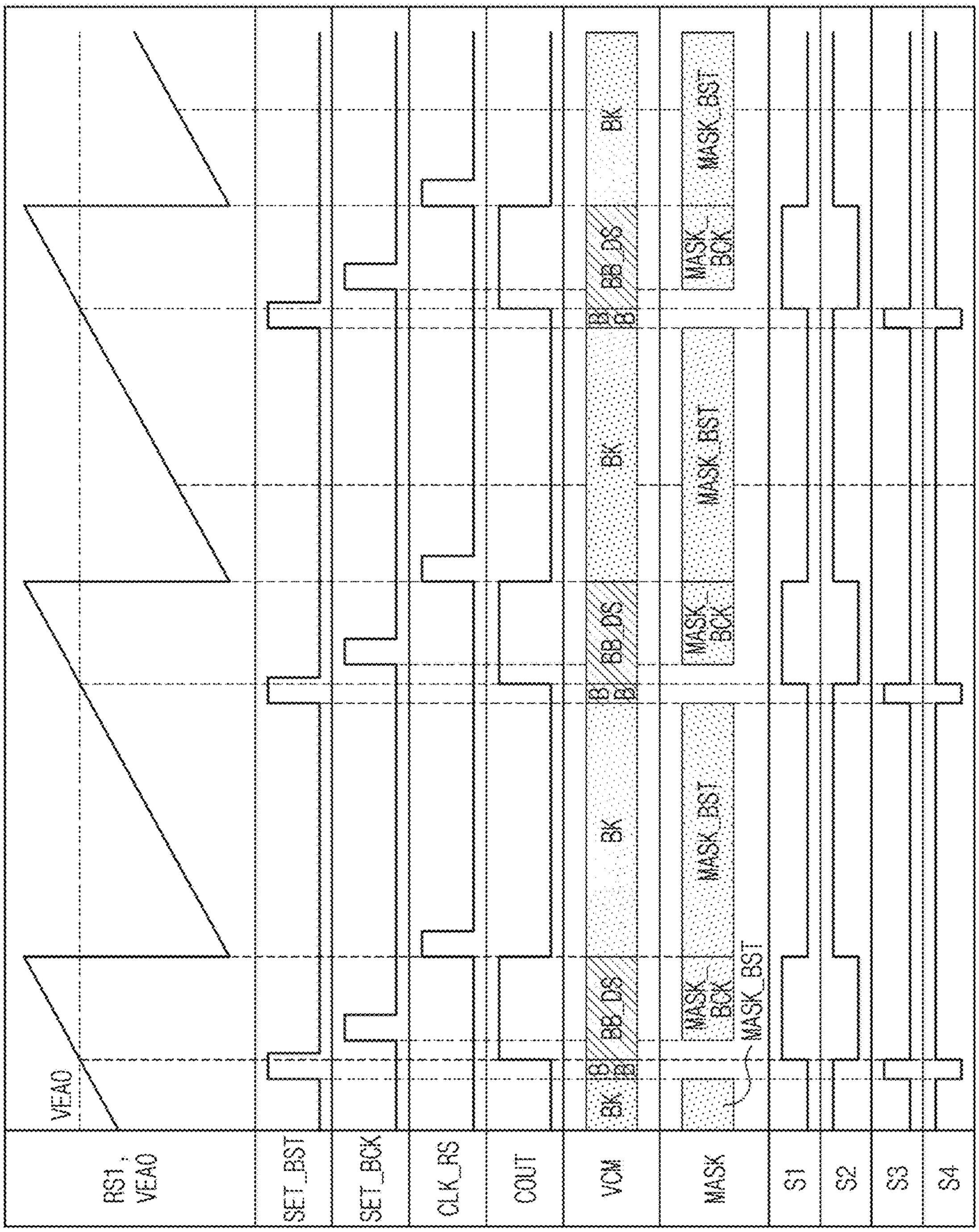
FIG. 17 illustrates an example of signals when a DC-DC converter performs charging of a buck conversion manner, charging of a buck-boost conversion manner, and discharging of a buck-boost conversion manner.

FIG. 17 illustrates an example of signals in which the DC-DC converter 100 performs the charging BK of the buck conversion manner, the charging BB of the buck-boost conversion manner, and the discharging BB_DS of the buck-boost conversion manner. In various example embodiments, how the first ramp signal RS1, the error voltage VEAO, the boost clock signal SET_BST, the buck clock signal SET_BCK, the ramp clock signal CLK_RS, the comparison signal COUT, the voltage conversion manner VCM, mask signals, the first signal S1, the second signal S2, the third signal S3, and the fourth signal S4 change over time is illustrated in FIG. 17.

Referring to FIGS. 1, 2, and 17, in the charging BB of the buck conversion manner, which is initiated by the toggling of the ramp clock signal CLK_RS, as described with reference to FIGS. 11 and 14, the first signal S1 may have the high level such that the first switch SW1 is turned on. In the charging BB of the buck-boost conversion manner, which is initiated by the toggling of the boost clock signal SET_BST, the first signal S1 may have the high level such that the first switch SW1 is turned on. That is, in the charging BK of the buck conversion manner and the charging BB of the buck-boost conversion manner, the first signal S1 may maintain the high level. In the discharging BB_DS of the buck-boost conversion manner, the first signal S1 may have the low level such that the first switch SW1 is turned off.

In the charging BK of the buck conversion manner, the second signal S2 may have the low level such that the second switch SW2 is turned off. In the charging BB of the buck-boost conversion manner, the second signal S2 may have the low level such that the second switch SW2 is turned off. That is, in the charging BK of the buck conversion manner and the charging BB of the buck-boost conversion manner, the second signal S2 may maintain the low level. In the discharging BB_DS of the buck-boost conversion manner, the second signal S2 may have the high level such that the second switch SW2 is turned on.

In the charging BK of the buck conversion manner, the third signal S3 may have the low level such that the third switch SW3 is turned off. In the charging BB of the buck-boost conversion manner, the third signal S3 may have the high level such that the third switch SW3 is turned on. In the discharging BB_DS of the buck-boost conversion manner, the third signal S3 may have the low level such that the third switch SW3 is turned off. That is, during the one cycle, the third signal S3 may have two transitions, that is, a low-to-high transition and a high-to-low transition.

In the charging BK of the buck conversion manner, the fourth signal S4 may have the high level such that the fourth switch SW4 is turned on. In the charging BB of the buck-boost conversion manner, the fourth signal S4 may have the low level such that the fourth switch SW4 is turned off. In the discharging BB_DS of the buck-boost conversion manner, the fourth signal S4 may have the high level such that the fourth switch SW4 is turned on. That is, during the one cycle, the fourth signal S4 may have two transitions, that is, a low-to-high transition and a high-to-low transition.

In various example embodiments, in the buck-boost conversion manner, the duty ratio "D" (e.g., a duty ratio of the charging period) may be expressed by Equation 3 below. In Equation 3 above, a variable "x" may indicate a ratio of the buck-boost conversion manner in the one cycle. The ratio of the buck-boost conversion manner may indicate how much a delay amount of the buck clock signal SET_BCK delayed with respect to the boost clock signal SET_BST occupies the one cycle.

$$D = \frac{\left(2 - \frac{x}{100}\right)VO}{VIN + VO} \quad \text{[Equation 3]}$$

As illustrated in FIG. 6, when the ratio of the buck-boost conversion manner is 10% (e.g., 0.1DT), the duty ratio "D" may be expressed by Equation 4 below.

$$D = \frac{1.9VO}{VIN + VO} \quad \text{[Equation 4]}$$

According to Equation 3 and Equation 4 above, even though a configuration and an operation manner of the DC-DC converter 100 according to various example embodiments are different from those of a conventional DC-DC converter, the DC-DC converter 100 may operate in the buck-boost conversion manner by using the duty ratio "D" similar to that of that the conventional DC-DC converter.

Figure 18:
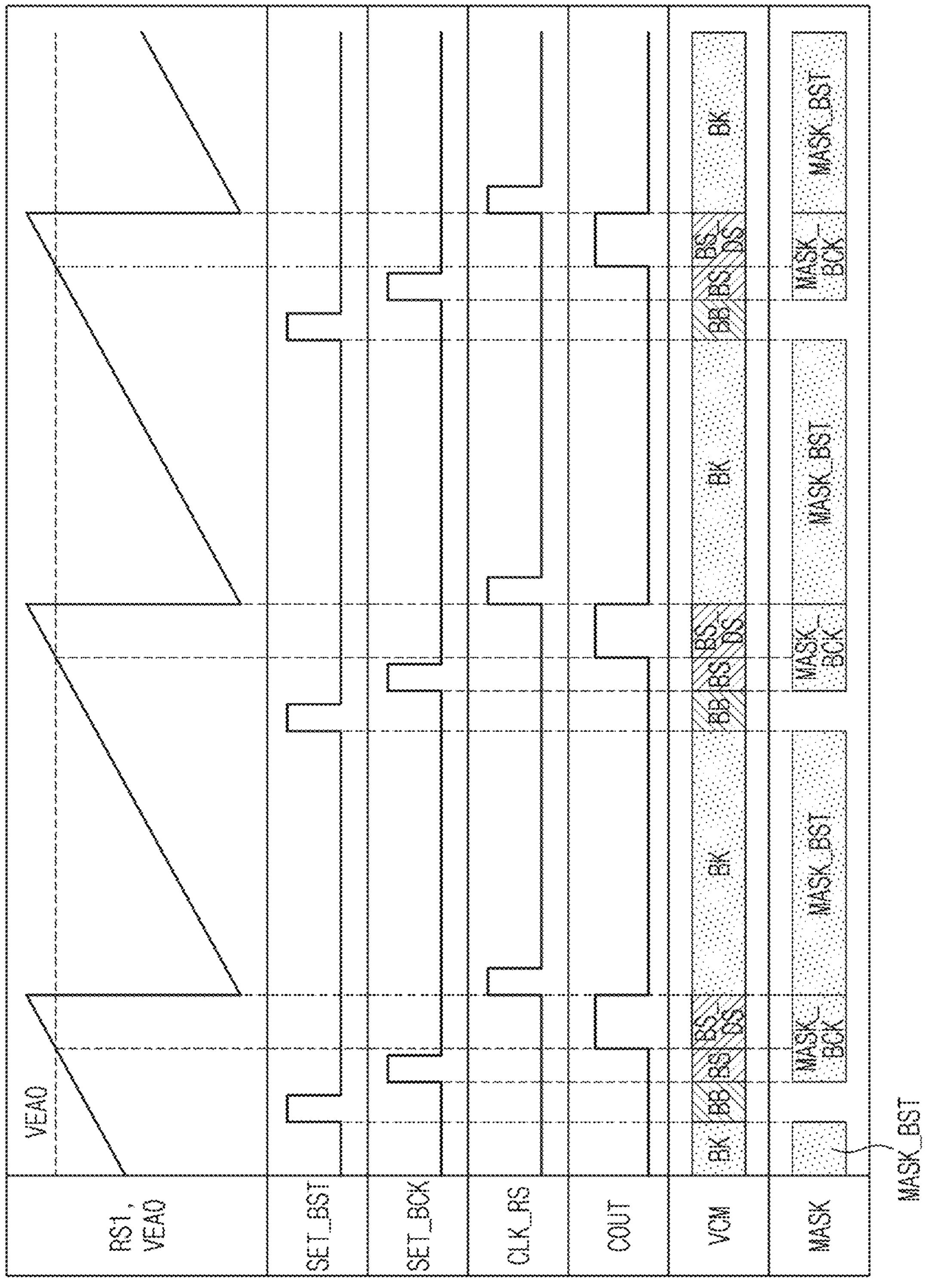
FIG. 18 illustrates an example in which a DC-DC converter performs charging of a buck conversion manner, charging of a buck-boost conversion manner, charging of a boost conversion manner, and discharging of a boost conversion manner.

FIG. 18 illustrates an example in which the DC-DC converter 100 performs charging of a buck conversion manner, charging of a buck-boost conversion manner, charging of a boost conversion manner, and discharging of a boost conversion manner. In various example embodiments, how the first ramp signal RS1, the error voltage VEAO, the boost clock signal SET_BST, the buck clock signal SET_BCK, the ramp clock signal CLK_RS, the comparison signal COUT, the voltage conversion manner VCM, and mask signals change over time is illustrated in FIG. 18.

Referring to FIGS. 1, 2, and 18, when the ramp clock signal CLK_RS toggles, the first ramp signal RS1 may be reset, and the one cycle may start. Also, when the ramp clock signal CLK_RS toggles, the buck mode may be activated, and the boost mask signal MASK_BST may be activated. The DC-DC converter 100 may perform the charging BK of the buck conversion manner to charge the internal elements in the buck conversion manner.

In various example embodiments, before the comparison signal COUT transitions to the high level, the boost clock signal SET_BST may toggle. As the boost clock signal SET_BST toggles, the boost mask signal MASK_BST may be deactivated. The DC-DC converter 100 may activate (or allow) the boost mode by releasing masking of the boost mode. Because both the buck mode and the boost mode are activated, the DC-DC converter 100 may perform charging BB of the buck-boost conversion manner to charge the internal elements in the buck-boost conversion manner.

In various example embodiments, before the comparison signal COUT transitions to the high level, the buck clock signal SET_BCK may toggle. As the buck clock signal SET_BCK toggles, as marked by "MASK_BCK", the DC-DC converter 100 may deactivate (or prohibit) the buck mode by masking the buck mode. Because only the boost mode is activated, the DC-DC converter 100 may perform the charging BS of the boost conversion manner to charge the internal elements in the boost conversion manner.

In various example embodiments, after the buck clock signal SET_BCK toggles, the comparison signal COUT may transition to the high level. When the comparison signal COUT transitions to the high level, the switch controller 240 may enter the discharging period of the one cycle. Because the last voltage conversion manner of the charging period is the boost conversion manner, the DC-DC converter 100 may perform discharging BS_DS of the boost conversion manner to discharge the internal elements in the boost conversion manner.

Figure 19:
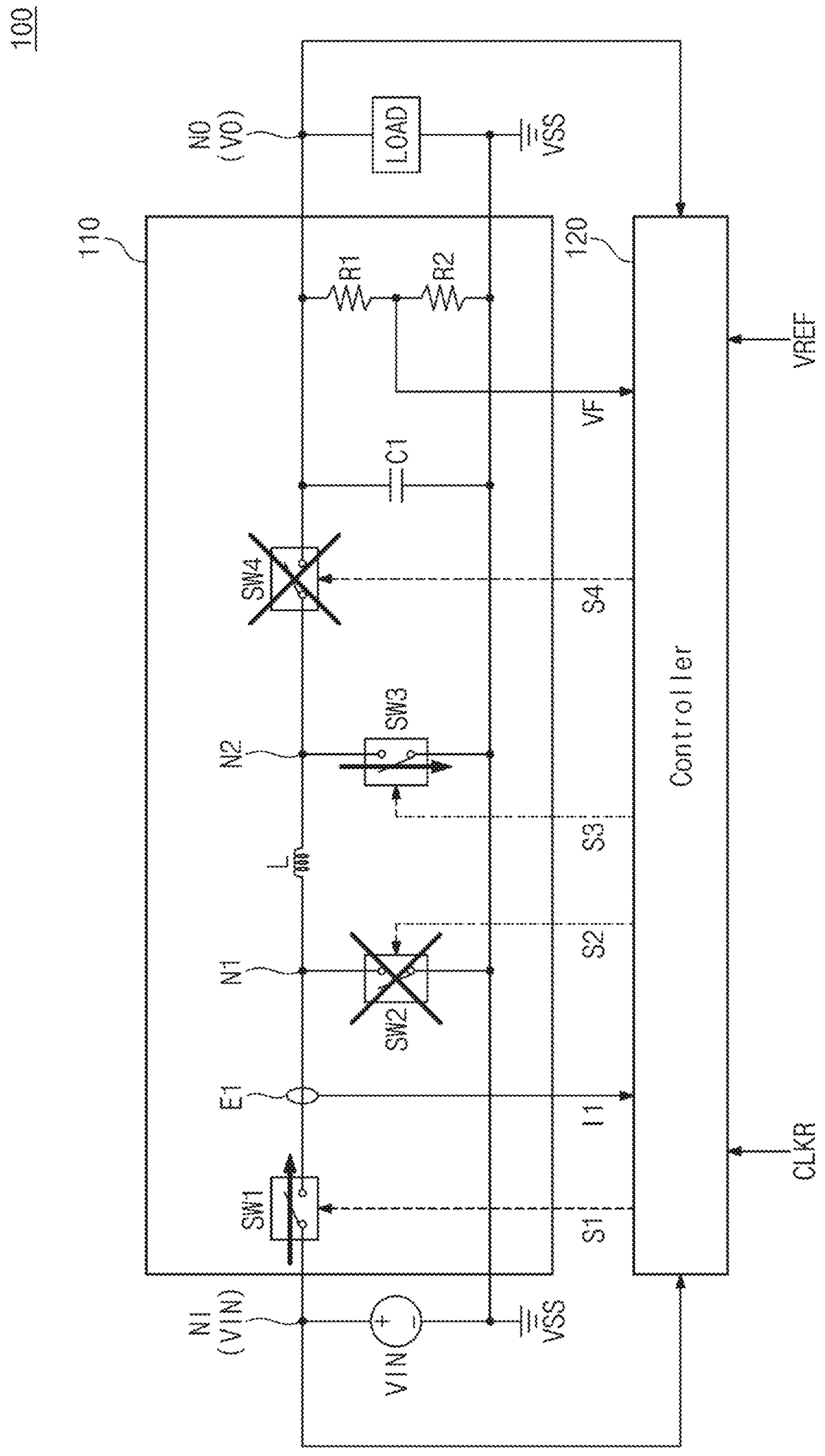
FIG. 19 illustrates an example in which a DC-DC converter controls a first switch, a second switch, a third switch, and a fourth switch while performing charging of a boost conversion manner.

FIG. 19 illustrates an example in which the DC-DC converter 100 controls the first switch SW1, the second switch SW2, the third switch SW3, and the fourth switch SW4 while performing the charging BS of the boost conversion manner.

Referring to FIG. 19, while performing the charging BS of the boost conversion manner, the controller 120 may turn on the first switch SW1, may turn off the second switch SW2, may turn on the third switch SW3, and may turn off the fourth switch SW4.

The input voltage VIN may be connected to an electrical path including the first switch SW1, the inductor L, the third switch SW3, and the ground node to which the ground voltage VSS is applied and may charge the inductor L.

In various example embodiments, the control states of the first switch SW1, the second switch SW2, the third switch SW3, and the fourth switch SW4 in the charging BS of the boost conversion manner may the same as the control states of the first switch SW1, the second switch SW2, the third switch SW3, and the fourth switch SW4 in the charging BB of the buck-boost conversion manner.

Figure 20:
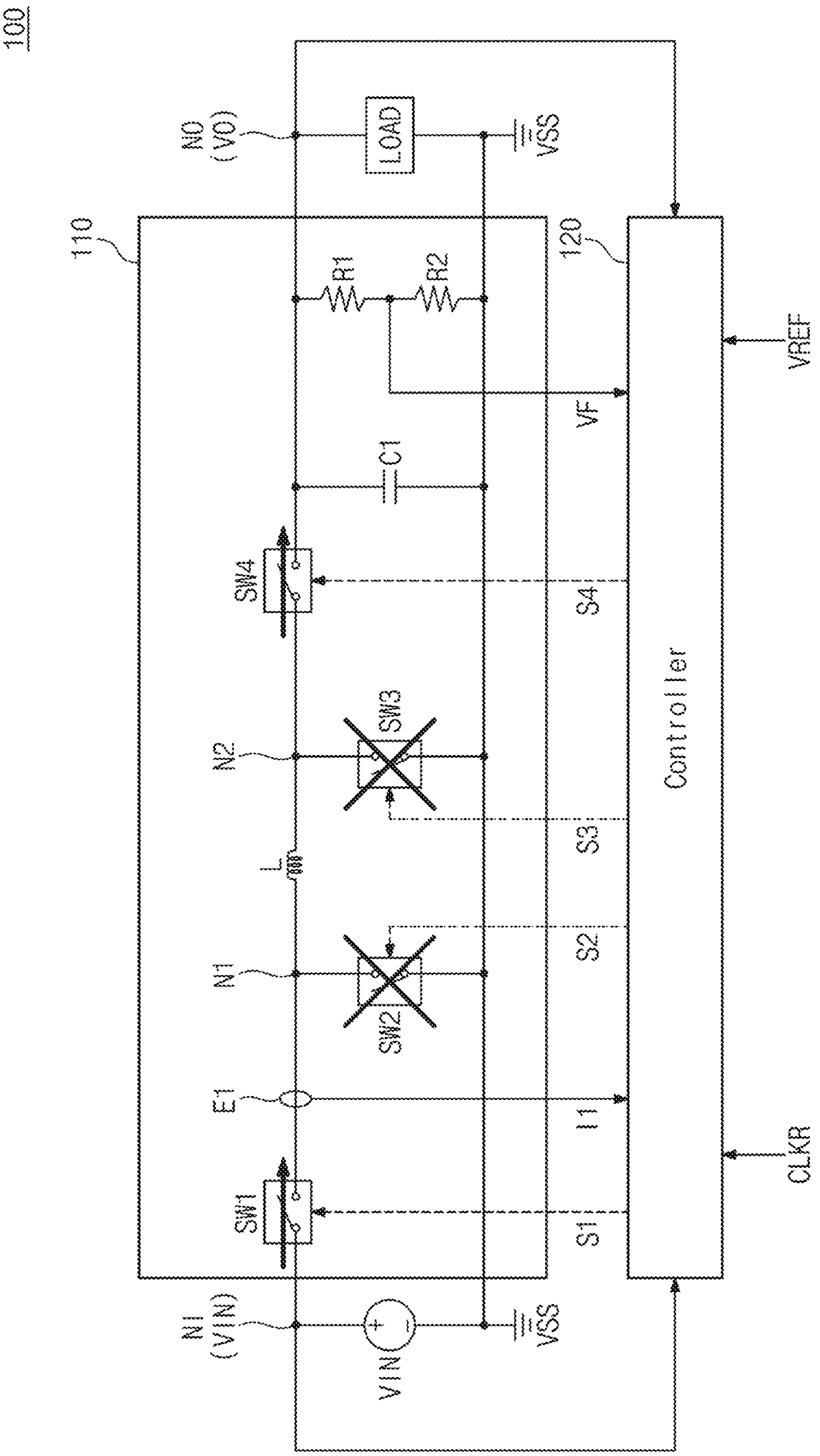
FIG. 20 illustrates an example in which a DC-DC converter controls a first switch, a second switch, a third switch, and a fourth switch while performing discharging of a boost conversion manner.

FIG. 20 illustrates an example in which the DC-DC converter 100 controls the first switch SW1, the second switch SW2, the third switch SW3, and the fourth switch SW4 while performing the discharging BS_DS of the boost conversion manner.

Referring to FIG. 20, while performing the discharging BS_DS of the boost conversion manner, the controller 120 may turn on the first switch SW1, may turn off the second switch SW2, may turn off the third switch SW3, and may turn on the fourth switch SW4.

The inductor L and the first capacitor C1 may be connected between the input node NI and the output node NO. The input voltage VIN and the charges stored in the inductor L may charge the first capacitor C1 may be output as the output voltage VO. That is, a sum of the input voltage VIN and the charged voltage of the inductor L and the first capacitor C1 may be provided as the output voltage VO.

Figure 21:
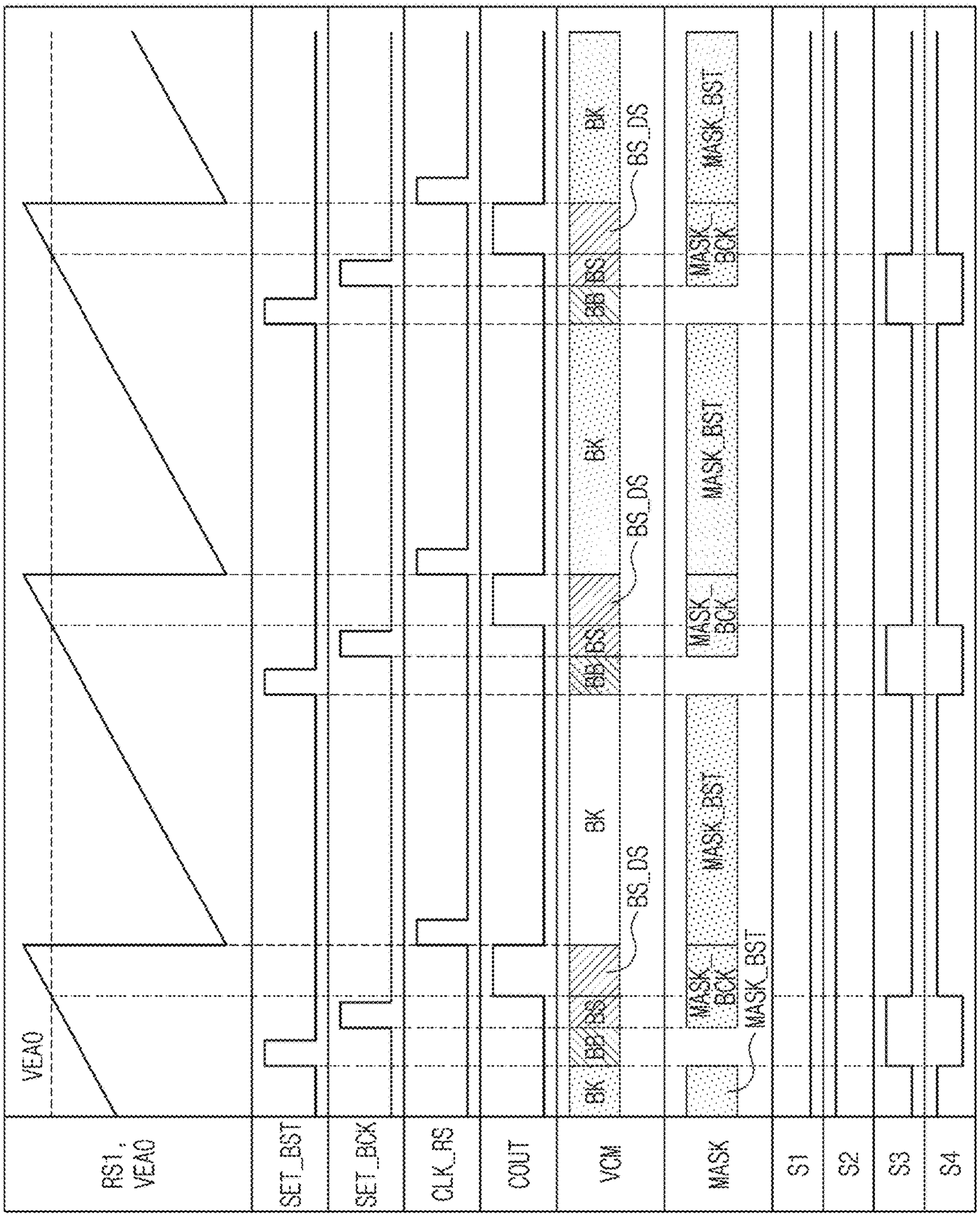
FIG. 21 illustrates an example of signals when a DC-DC converter performs charging of a buck conversion manner, charging of a buck-boost conversion manner, charging of a boost conversion manner, and discharging of a boost conversion manner.

FIG. 21 illustrates an example of signals in which the DC-DC converter 100 performs the charging BK of the buck conversion manner, the charging BB of the buck-boost conversion manner, the charging BS of the boost conversion manner, and the discharging BS_DS of the boost conversion manner. In various example embodiments, how the first ramp signal RS1, the error voltage VEAO, the boost clock signal SET_BST, the buck clock signal SET_BCK, the ramp clock signal CLK_RS, the comparison signal COUT, the voltage conversion manner VCM, mask signals, the first signal S1, the second signal S2, the third signal S3, and the fourth signal S4 change over time is illustrated in FIG. 21.

Referring to FIGS. 1, 2, and 21, in the charging BB of the buck conversion manner, which is initiated by the toggling of the ramp clock signal CLK_RS, as described with reference to FIGS. 11 and 14, the first signal S1 may have the high level such that the first switch SW1 is turned on. In the charging BB of the buck-boost conversion manner, which is initiated by the toggling of the boost clock signal SET_BST, the first signal S1 may have the high level such that the first switch SW1 is turned on. In the charging BS of the boost conversion manner, which is initiated by the toggling of the buck clock signal SET_BCK, the first signal S1 may have the high level such that the first switch SW1 is turned on. That is, in the charging BK of the buck conversion manner, the charging BB of the buck-boost conversion manner, and the charging BS of the boost conversion manner, the first signal S1 may maintain the high level. In the discharging BS_DS of the boost conversion manner, the first signal S1 may have the high level such that the first switch SW1 is turned on. In some example embodiments, during the one cycle where the charging BK of the buck conversion manner, the charging BB of the buck-boost conversion manner, the charging BS of the boost conversion manner, and the discharging BS_DS of the boost conversion manner are performed, the first signal S1 may maintain the high level, and thus, the first switch SW1 may be turned on.

In the charging BK of the buck conversion manner, the second signal S2 may have the low level such that the second switch SW2 is turned off. In the charging BB of the buck-boost conversion manner, the second signal S2 may have the low level such that the second switch SW2 is turned off. In the charging BS of the boost conversion manner, the second signal S2 may have the low level such that the second switch SW2 is turned off. In some example embodiments, in the charging BK of the buck conversion manner, the charging BB of the buck-boost conversion manner, and the charging BS of the boost conversion manner, the second signal S2 may maintain the low level. In the discharging BS_DS of the boost conversion manner, the second signal S2 may have the low level such that the second switch SW2 is turned off. In some example embodiments, during one cycle where the charging BK of the buck conversion manner, the charging BB of the buck-boost conversion manner, the charging BS of the boost conversion manner, and the discharging BS_DS of the boost conversion manner are performed, the second signal S2 may maintain the low level, and thus, the second switch SW2 may be turned off.

In the charging BK of the buck conversion manner, the third signal S3 may have the low level such that the third switch SW3 is turned off. In the charging BB of the buck-boost conversion manner, the third signal S3 may have the high level such that the third switch SW3 is turned on. In the charging BS of the boost conversion manner, the third signal S3 may have the high level such that the third switch SW3 is turned on. In the discharging BS_DS of the boost conversion manner, the third signal S3 may have the low level such that the third switch SW3 is turned off. In some example embodiments, during one cycle, the third signal S3 may have two transitions, that is, a low-to-high transition and a high-to-low transition.

In the charging BK of the buck conversion manner, the fourth signal S4 may have the high level such that the fourth switch SW4 is turned on. In the charging BB of the buck-boost conversion manner, the fourth signal S4 may have the low level such that the fourth switch SW4 is turned off. In the charging BS of the boost conversion manner, the fourth signal S4 may have the low level such that the fourth switch SW4 is turned off. In the discharging BS_DS of the boost conversion manner, the fourth signal S4 may have the high level such that the fourth switch SW4 is turned on. In some example embodiments, during the one cycle, the fourth signal S4 may have two transitions such as a low-to-high transition and a high-to-low transition.

As described above, the DC-DC converter 100 according to various example embodiments may sequentially select the charging BK of the buck conversion manner, the charging BB of the buck-boost conversion manner, and the charging BS of the boost conversion manner during the charging period based on predetermined timings, by comparing the sensing voltage VSEN, which is generated based on one ramp signal, for example, the first ramp signal RS1, and the error voltage VEAO. Also, the DC-DC converter 100 may perform discharging corresponding to the last conversion manner of the charging period. Because only one ramp signal, that is, the first ramp signal RS1 is used for comparison with the error voltage VEAO, the costs and complexity may decrease compared to the cases where two or more ramp signals are used. Also, compared to the cases where an offset is added under the condition that one ramp signal is used, ripples that are caused due to the addition of the offset may be prevented or reduced in likelihood of occurrence and/or impact from occurrence.

In various example embodiments, in the boost conversion manner, the duty ratio "D" (e.g., a duty ratio of the charging period) may be expressed by Equation 5 below. According to Equation 5 below, even though a configuration and an operation manner of the DC-DC converter 100 according to various example embodiments are different from those of a conventional DC-DC converter, the DC-DC converter 100 may operate in the boost conversion manner by using the same duty ratio "D" as the conventional DC-DC converter.

$$D = \frac{VO - VIN}{VO} \qquad \text{[Equation 5]}$$

Figure 22:
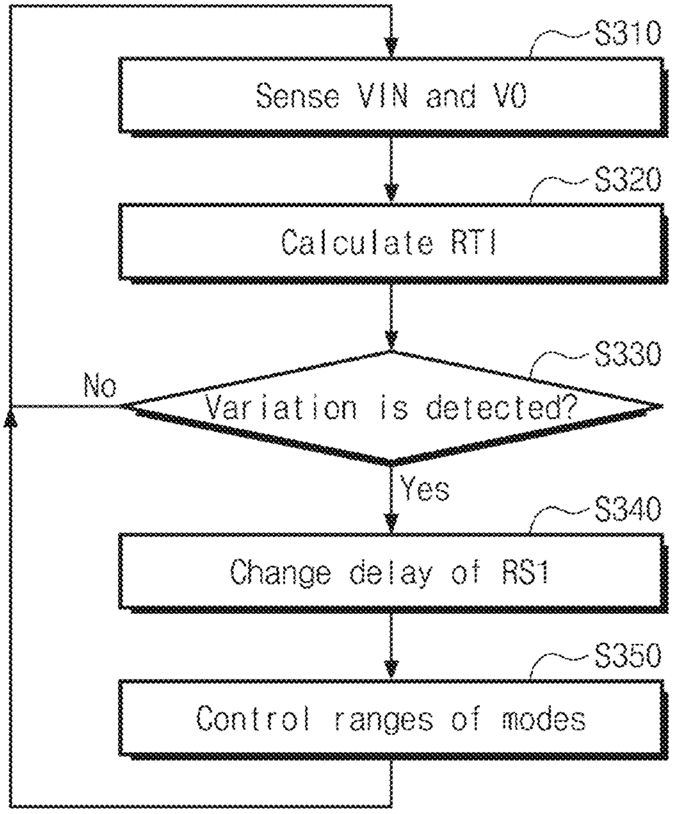
FIG. 22 illustrates another example of an operating method of a DC-DC converter according to various example embodiments.

FIG. 22 illustrates another example of an operating method of the DC-DC converter 100 according to various example embodiments. Referring to FIGS. 1, 2, 6, and 22, in operation S310, the controller 120 may sense the input voltage VIN and the output voltage VO. For example, the ratio calculator 210 that is included in the control circuit 200 of the controller 120 may receive the input voltage VIN and the output voltage VO.

In operation S320, the ratio calculator 210 that is included in the control circuit 200 of the controller 120 may calculate the ratio information RTI based on the input voltage VIN and the output voltage VO. For example, as described with reference to FIGS. 4 and 5, the ratio calculator 210 may calculate the ratio information RTI based on the second ramp signal RS2 or based on the one cycle of the second ramp signal RS2.

In operation S330, the controller 120 may determine whether a variation is detected from the ratio information RTI. For example, when the input voltage VIN or the output voltage VO changes, the ratio calculator 210 may change a value of the ratio information RTI. In some example embodiments, when the variation of the ratio information RTI is detected, the input voltage VIN or the output voltage VO changes may be identified as having changed.

When the variation is not detected from the ratio information RTI, the DC-DC converter 100 may maintain a present voltage conversion manner or present voltage conversion manners. Afterwards, the DC-DC converter 100 may again perform operation S310. When the variation is detected from the ratio information RTI, the DC-DC converter 100 may perform operation S340.

In operation S340, the controller 120 may change a delay of the first ramp signal RS1. For example, the delay unit 220 that is included in the control circuit 200 of the controller 120 may generate the ramp clock signal CLK_RS by delaying the delay clock signal CLK_DLY as much as the ratio information RTI.

In operation S350, the controller 120 may control ranges of modes. For example, the ramp generator 320 that is included in the comparison circuit 300 of the controller 120 may reset the first ramp signal RS1 in response to the ramp clock signal CLK_RS. In some example embodiments, when the input voltage VIN or the output voltage VO changes, the ratio information RTI may change; in this case, the timing at which the first ramp signal RS1 is reset (or the timing at which the one cycle is reset or the length of the one cycle) may be adjusted. When the reset timing of the first ramp signal RS1 is adjusted, even though the input voltage VIN or the output voltage VO changes, the output voltage VO may quickly follow the target level.

Figure 23:
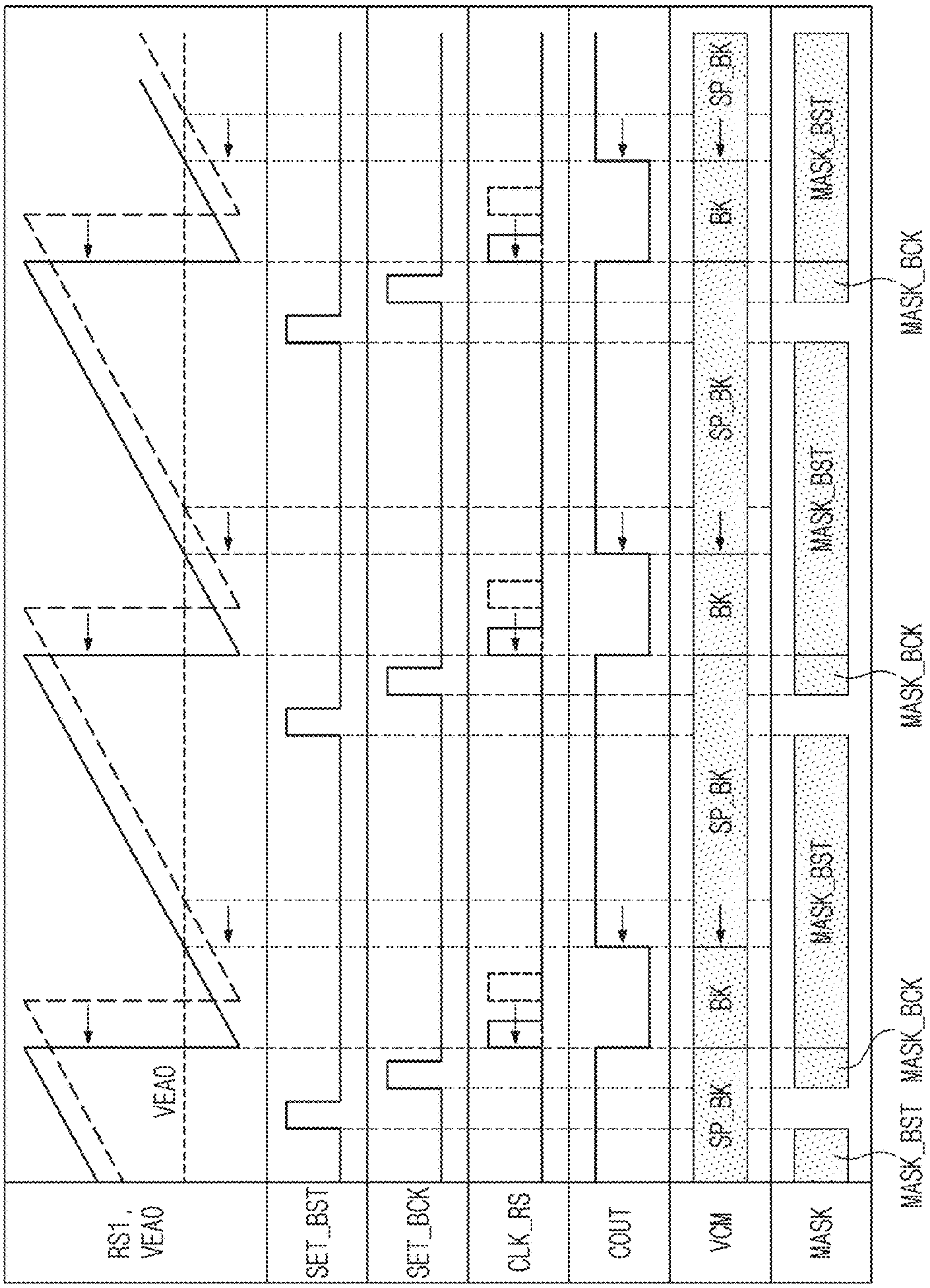
FIG. 23 illustrates an example in which a reset timing of a first ramp signal advances compared to FIG. 10.

FIG. 23 illustrates an example in which a reset timing of the first ramp signal RS1 advances compared to FIG. 10. Referring to FIGS. 1, 2, and 23, when the input voltage VIN increases or the output voltage VO decreases, the ratio information RTI may decrease. For example, the decrease in the input voltage VIN may cause the decrease in the output voltage VO. Alternatively, the increase of the load may cause the decrease in the output voltage VO. In some example embodiments, the decrease in the output voltage VO may cause the decrease in the ratio information RTI.

When the ratio information RTI decreases, the ramp clock signal CLK_RS may advance. When the ramp clock signal CLK_RS advances, the reset timing of the first ramp signal RS1 that is reset in synchronization with the ramp clock signal CLK_RS may also advance.

For example, when the advance of the reset timing is made in the first one cycle, the discharging period of the first one cycle may decrease as much as the advance of the reset timing. Alternatively or additionally, the charging period of the second one cycle following the first one cycle may start quickly as much as the advance of the reset timing. When the discharging period decreases and the start timing of the next charging period advances, the output voltage VO may increase. In some example embodiments, the output voltage VO may increase and may follow the target level.

Figure 24:
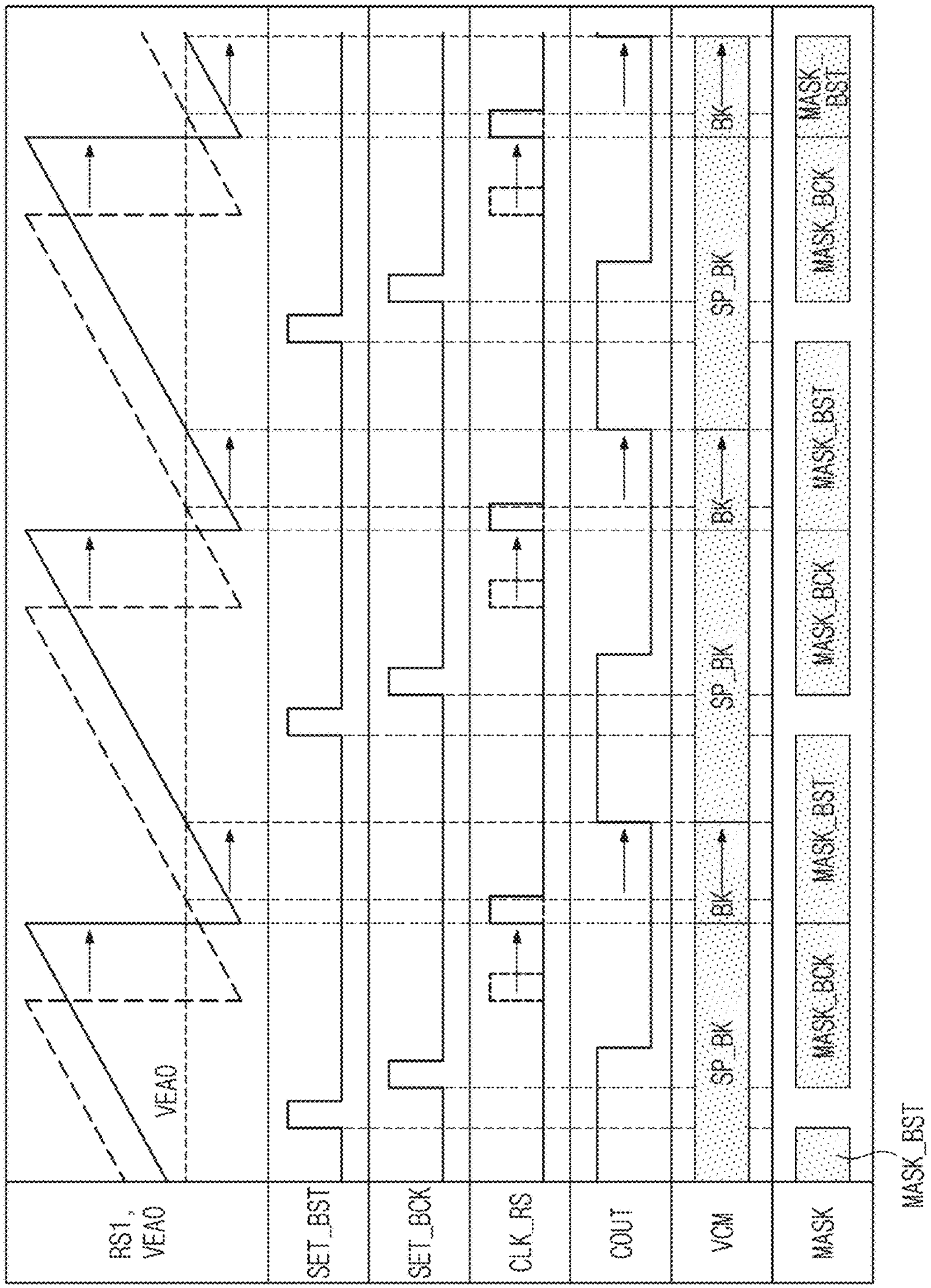
FIG. 24 illustrates an example in which a reset timing of a first ramp signal is delayed compared to FIG. 10.

FIG. 24 illustrates an example in which a reset timing of the first ramp signal RS1 is delayed compared to FIG. 10. Referring to FIGS. 1, 2, and 24, when the input voltage VIN decreases or the output voltage VO increases, the ratio information RTI may increase. For example, the increase in the input voltage VIN may cause the increase in the output voltage VO. Alternatively, the decrease of the load may cause the increase in the output voltage VO. That is, the increase in the output voltage VO may cause the increase in the ratio information RTI.

When the ratio information RTI increases, the ramp clock signal CLK_RS may be delayed. When the ramp clock signal CLK_RS is delayed, the reset timing of the first ramp signal RS1 that is reset in synchronization with the ramp clock signal CLK_RS may also be delayed.

For example, when the delay of the reset timing is made in the first one cycle, the discharging period of the first one cycle may increase as much as the delay of the reset timing. Also, the charging period of the second one cycle following the first one cycle may start to be later as much as the delay of the reset timing. When the discharging period increases and the start timing of the next charging period is delayed, the output voltage VO may decrease. That is, the output voltage VO may decrease and may follow the target level.

In various example embodiments, a delay time may exist until the change in the input voltage VIN and/or the output voltage VO causes the change in the error voltage VEAO of the comparison circuit 300. The control circuit 200 may immediately react to the change in the input voltage VIN and the output voltage VO to adjust the reset timing of the first ramp signal RS1. When the output voltage VO follows the target level through the adjustment of the reset timing of the first ramp signal RS1, the change in the input voltage VIN and the output voltage VO may not cause the change in the error voltage VEAO.

In various example embodiments, because only the reset timing of the first ramp signal RS1 is adjusted in a state where the timing of the boost clock signal SET_BST and the timing of the buck clock signal SET_BCK are fixed, when the reset timing of the first ramp signal RS1 is adjusted, the voltage conversion manner may be switched while maintaining the error voltage VEAO.

A relatively small change in the input voltage VIN and/or the output voltage VO may be compensated for, or at least partly compensated for, while maintaining the level of the error voltage VEAO, by adjusting the reset timing of the first ramp signal RS1. A relatively great change in the input voltage VIN or the output voltage VO, for example, a change that is great enough to cause the change in the error voltage VEAO even though the reset timing of the first ramp signal RS1 is adjusted may be compensated for or at least partly compensated for by adjusting the length of the charging time and the length of the discharging time based on the comparison signal COUT or by changing the voltage conversion manner VCM based on the comparison signal COUT, the boost clock signal SET_BST, and the buck clock signal SET_BCK.

Figure 25:
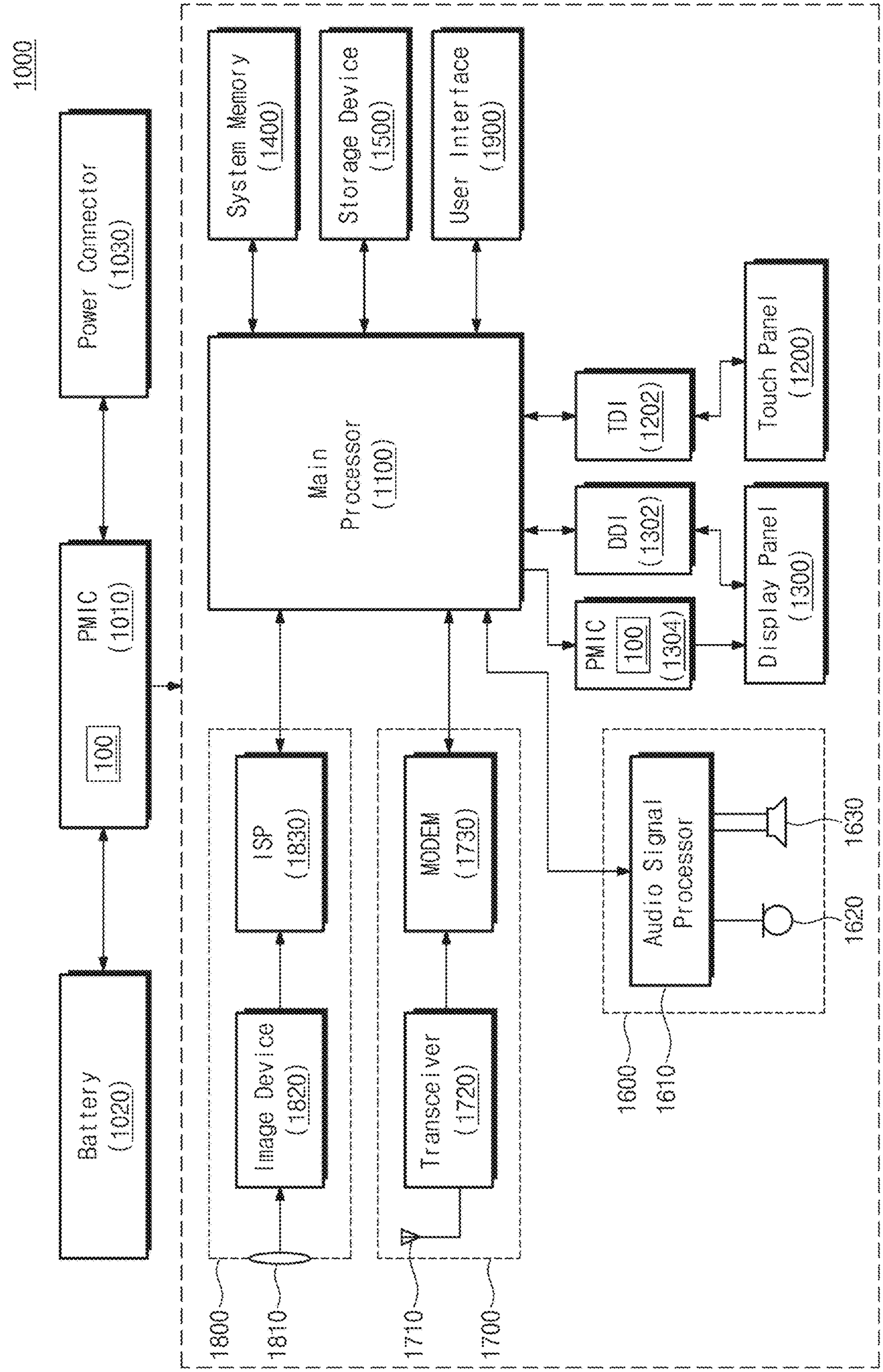
FIG. 25 is a block diagram illustrating an electronic device including a DC-DC converter according to various example embodiments.

FIG. 25 is a diagram illustrating an electronic device 1000 including the DC-DC converter 100 according to various example embodiments. Referring to FIG. 25, the electronic device 1000 may include a main processor 1100, a touch panel 1200, a touch driver integrated circuit (TDI) 1202, a display panel 1300, a display driver integrated circuit (DDI) 1302, a system memory 1400, a storage device 1500, an audio processor 1600, a communication block 1700, an image processor 1800, and a user interface 1900. In various example embodiments, the electronic device 1000 may be or include or be included in one or more of various electronic devices such as one or more of a personal computer, a laptop computer, a server, a workstation, a portable communication terminal, a personal digital assistant (PDA), a portable media player (PMP), a digital camera, a smartphone, a tablet computer, and a wearable device.

The main processor 1100 may control an overall operation of the electronic device 1000. The main processor 1100 may control/manage operations of the components of the electronic device 1000. The main processor 1100 may perform various operations for the purpose of operating the electronic device 1000. The touch panel 1200 may be configured to sense a touch input, e.g., from a user under control of the touch driver integrated circuit 1202. The display panel 1300 may be configured to display image information under control of the display driver integrated circuit 1302.

The system memory 1400 may store data that are used in an operation of the electronic device 1000. For example, the system memory 1400 may include a volatile memory such as one or more of a static random access memory (SRAM), a dynamic RAM (DRAM), or a synchronous DRAM (SDRAM), and/or a nonvolatile memory such as a phase change RAM (PRAM), a magneto-resistive RAM (MRAM), a resistive RAM (ReRAM), or a ferroelectric RAM (FRAM).

The storage device 1500 may store data regardless of whether a power is supplied. For example, the storage device 1500 may include at least one of various nonvolatile memories such as one or more of a flash memory, a PRAM, an MRAM, a ReRAM, and a FRAM. For example, the storage device 1500 may include an embedded memory and/or a removable memory of the electronic device 1000.

The audio processor 1600 may process an audio signal by using an audio signal processor 1610. The audio processor 1600 may receive an audio input through a microphone 1620 or may provide an audio output through a speaker 1630. The communication block 1700 may exchange signals with an external device/system through an antenna 1710. A transceiver 1720 and a modulator/demodulator (MODEM) 1730 of the communication block 1700 may process signals exchanged with the external device/system, based on at least one of various wireless communication protocols, such as one or more of long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 1800 may receive a light through a lens 1810. An image device 1820 and an image signal processor (ISP) 1830 included in the image processor 1800 may generate image information about an external object, based on a received light. The user interface 1900 may include an interface capable of exchange information with a user, except for the touch panel 1200, the display panel 1300, the audio processor 1600, and the image processor 1800. The user interface 1900 may include a keyboard, a mouse, a printer, a projector, various sensors, a human body communication device, etc.

The electronic device 1000 may further include a power management IC (PMIC) 1010, a battery 1020, and a power connector 1030. The power management IC 1010 may generate an internal power from a power supplied from the battery 1020 or a power supplied from the power connector 1030, and may provide the internal power to the main processor 1100, the touch panel 1200, the touch driver integrated circuit (TDI) 1202, the display panel 1300, the display driver integrated circuit (DDI) 1302, the system memory 1400, the storage device 1500, the audio processor 1600, the communication block 1700, the image processor 1800, and the user interface 1900. The power management IC 1010 may include the DC-DC converter 100 according to various example embodiments. The DC-DC converter 100 may change a voltage conversion manner by activating or deactivating the buck mode and the boost mode at a given timing in the charging period of the one cycle. In the discharging period of the one cycle, the DC-DC converter 100 may perform discharging in the last voltage conversion manner of the charging period. The DC-DC converter 100 may adjust a reset timing of a ramp signal or a reset timing of a one cycle based on the input voltage VIN and the output voltage VO.

The electronic device 1000 may further include a display power management integrated circuit 1304. The display power management integrated circuit 1304 may manage the power that is supplied to the display panel 1300. The display power management integrated circuit 1304 may include the DC-DC converter 100 according to various example embodiments. The DC-DC converter 100 may change a voltage conversion manner by activating and/or deactivating the buck mode and the boost mode at a given timing in the charging period of the one cycle. In the discharging period of the one cycle, the DC-DC converter 100 may perform discharging in the last voltage conversion manner of the charging period. The DC-DC converter 100 may adjust a reset timing of a ramp signal or a reset timing of the one cycle based on the input voltage VIN and the output voltage VO.

In various example embodiments, components are described by using the terms "first", "second", "third", etc. However, the terms "first", "second", "third", etc. may be used to distinguish components from each other and do not limit example embodiments. For example, the terms "first", "second", "third", etc. may not involve an order or a numerical meaning of any form, unless clear from context.

In various example embodiments, components according to embodiments are referenced by using blocks. The blocks may be implemented with various hardware devices, such as one or more of an integrated circuit, an application specific IC (ASIC), an arithmetic logic unit (ALU), a field programmable gate array (FPGA), and a complex programmable logic device (CPLD), firmware driven in hardware devices, software such as an application, or a combination of a hardware device and software. Alternatively or additionally, the blocks may include circuits implemented with semiconductor elements in an integrated circuit, or circuits enrolled as an intellectual property (IP).

According to various example embodiments, a DC-DC converter which intuitionally or intentionally determines operation modes and/or conversion manners based on one cycle and on a ratio of an input voltage and an output voltage and/or has an improved and/or reduced complexity, and/or an operating method of the DC-DC converter are provided.

While various example embodiments have been described with reference to embodiments thereof, it will be apparent to those of ordinary skill in the art that various changes and modifications may be made thereto without departing from the spirit and scope as set forth in the following claims. Additionally, example embodiments are not necessarily mutually exclusive with one another. For example, some example embodiments may include one or more features described with reference to one or more figures, and may also include one or more other features described with reference to one or more other figures.

What is claimed is:

1. A DC-DC converter comprising:

a voltage converter configured to receive an input voltage through an input node, to convert the input voltage into an output voltage, and to output the output voltage to an output node; and a controller configured to select at least one conversion manner among a plurality of conversion manners with the selection based on a first ratio of a charging period of one cycle, to charge internal elements in the at least one conversion manner during the charging period of the one cycle, and to control the voltage converter to discharge the internal elements in the at least one conversion manner during a discharging period of the one cycle, wherein the one cycle is based on a ramp signal, the ramp signal beginning at one voltage at a beginning of the one cycle, ending at another voltage higher than the one voltage at an end of the one cycle, and resetting to the one voltage at the beginning of a next cycle after the one cycle.

2. The DC-DC converter of claim 1, wherein the plurality of conversion manners include a buck conversion manner, a buck-boost conversion manner, and a boost conversion manner.

3. The DC-DC converter of claim 2, wherein the controller is configured to sequentially select the buck conversion manner, the buck-boost conversion manner, and the boost conversion manner based on the first ratio, during the charging period.

4. The DC-DC converter of claim 3, wherein the controller is configured to determine a timing to start the discharging period, based on a level of an error voltage corresponding to a difference between the output voltage and a target voltage of the output voltage.

5. The DC-DC converter of claim 1, wherein the controller is configured to adjust a timing to reset the one cycle based on the input voltage and the output voltage.

6. The DC-DC converter of claim 5, wherein the controller is configured to advance the timing to reset the one cycle as a second ratio of the output voltage to the input voltage decreases.

7. The DC-DC converter of claim 6, wherein, in response to advancing the timing to reset the one cycle, the controller is configured to decrease a length of the discharging period of the one cycle and to advance starting of the charging period of a next one cycle.

8. The DC-DC converter of claim 5, wherein the controller is configured to delay the timing to reset the one cycle as a ratio of the output voltage to the input voltage increases.

9. The DC-DC converter of claim 8, wherein, in response to delaying the timing to reset the one cycle, the controller is configured to increase a length of the discharging period of the one cycle and to delay starting of the charging period of a next one cycle.

10. The DC-DC converter of claim 1, wherein the controller is configured to:

receive a reference clock signal corresponding to the one cycle; and allow the voltage converter to start a boost conversion manner among the plurality of conversion manners in synchronization with the reference clock signal in the charging period.

11. The DC-DC converter of claim 10, wherein the controller is configured to:

generate a first clock signal by delaying the reference clock signal as much as a first delay value; and enable the voltage converter to halt a buck conversion manner among the plurality of conversion manners in synchronization with the first clock signal in the charging period.

12. The DC-DC converter of claim 11, wherein, in the charging period, the controller is configured to enable the voltage converter to perform a buck-boost conversion manner among the plurality of conversion manners during a time period corresponding to the first delay value.

13. The DC-DC converter of claim 10, wherein the controller is configured to:

generate a second clock signal by delaying the reference clock signal as much as a second delay value; and reset the one cycle in synchronization with the second clock signal.

14. The DC-DC converter of claim 13, wherein the second delay value corresponds to a second ratio of the output voltage to the input voltage.

15. A DC-DC converter comprising:

a voltage converter configured to receive an input voltage through an input node, to convert the input voltage into an output voltage, and to output the output voltage to an output node; and a controller configured to charge internal elements during a charging period of one cycle and to control the voltage converter to discharge the internal elements during a discharging period of the one cycle, wherein the controller is configured to adjust a timing to reset the one cycle based on the input voltage and the output voltage, and wherein the one cycle is based on a ramp signal, the ramp signal beginning at one voltage at a beginning of the one cycle, ending at another voltage higher than the one voltage at an end of the one cycle, and resetting to the one voltage at the beginning of a next cycle after the one cycle.

16. The DC-DC converter of claim 15, wherein the controller is configured to advance the timing to reset the one cycle as a ratio of the output voltage to the input voltage decreases.

17. The DC-DC converter of claim 16, wherein, in response to advancing the timing to reset the one cycle, the controller is configured to decrease a length of the discharging period of the one cycle and to advance the charging period of a next one cycle.

18. The DC-DC converter of claim 15, wherein the controller is configured to delay the timing to reset the one cycle as a ratio of the output voltage to the input voltage increases.

19. The DC-DC converter of claim 18, wherein, in response to delaying the timing to reset the one cycle, the controller is configured to increase a length of the discharging period of the one cycle and to allow the charging period of a next one cycle to start to be later.

20. An operating method of a DC-DC converter configured to convert an input voltage into an output voltage, the method comprising:

performing charging of internal elements while changing a voltage conversion manner over time, the performing the charging of internal elements being in a charging period of one cycle;

performing discharging of the internal elements based on a last voltage conversion manner of the charging period, the performing the discharging of the internal elements being in a discharging period of the one cycle; and resetting the one cycle based on the input voltage and the output voltage, wherein the one cycle is based on a ramp signal, the ramp signal beginning at one voltage at a beginning of the one cycle, ending at another voltage higher than the one voltage at an end of the one cycle, and resetting to the one voltage at the beginning of a next cycle after the one cycle.

* * * * *